(12) United States Patent
Marr

(10) Patent No.: US 7,966,384 B2
(45) Date of Patent: Jun. 21, 2011

(54) REAL-TIME INTERACTIVE SYSTEM AND METHOD FOR MAKING AND UPDATING CHANGES TO INFRASTRUCTURE DATA

(75) Inventor: Paul Marr, Roanoke, VA (US)

(73) Assignee: Flat Hill Ideas, LLC, Roanoke, VA (US)

( * ) Notice: Subject to any disclaimer, the term of this patent is extended or adjusted under 35 U.S.C. 154(b) by 480 days.

(21) Appl. No.: 12/221,497

(22) Filed: Aug. 4, 2008

(65) Prior Publication Data

US 2010/0030810 A1 Feb. 4, 2010

(51) Int. Cl.
*G06F 15/16* (2006.01)
(52) U.S. Cl. ........ 709/219; 709/221; 709/225; 709/226; 709/229
(58) Field of Classification Search .................. 709/203, 709/217–221, 223–229
See application file for complete search history.

(56) References Cited

U.S. PATENT DOCUMENTS

| | | | |
|---|---|---|---|
| 5,870,451 A | 2/1999 | Winkler et al. | |
| 6,462,654 B1 * | 10/2002 | Sandelman et al. | 340/506 |
| 6,999,021 B2 | 2/2006 | Taylor, Jr. et al. | |
| 7,010,603 B2 * | 3/2006 | Martin et al. | 709/227 |
| 7,116,759 B2 | 10/2006 | Wright et al. | |
| 7,130,646 B2 * | 10/2006 | Wang | 455/456.5 |
| 7,340,342 B2 * | 3/2008 | Skarine | 701/211 |
| 7,428,321 B1 * | 9/2008 | Shah et al. | 382/118 |
| 7,480,507 B2 * | 1/2009 | Kuroda | 455/433 |
| 7,730,159 B1 * | 6/2010 | Meyer et al. | 709/217 |
| 7,739,396 B2 * | 6/2010 | Adams et al. | 709/230 |
| 7,870,490 B2 * | 1/2011 | Coles et al. | 715/735 |
| 2002/0022984 A1 | 2/2002 | Daniel et al. | |
| 2004/0003285 A1 * | 1/2004 | Whelan et al. | 713/201 |
| 2004/0090930 A1 * | 5/2004 | Lee et al. | 370/328 |
| 2004/0174961 A1 | 9/2004 | Hart et al. | |
| 2004/0264404 A1 * | 12/2004 | Zegelin | 370/328 |
| 2005/0120196 A1 | 6/2005 | Zito | |
| 2006/0168627 A1 * | 7/2006 | Zeinstra et al. | 725/75 |
| 2006/0235611 A1 * | 10/2006 | Deaton et al. | 701/207 |
| 2007/0115886 A1 * | 5/2007 | Davis et al. | 370/331 |
| 2007/0213071 A1 * | 9/2007 | Hwang | 455/456.1 |
| 2008/0049649 A1 * | 2/2008 | Kozisek et al. | 370/310 |
| 2010/0112997 A1 * | 5/2010 | Roundtree | 455/420 |
| 2010/0208711 A1 * | 8/2010 | Georgis et al. | 370/338 |

* cited by examiner

*Primary Examiner* — Faruk Hamza
(74) *Attorney, Agent, or Firm* — Spilman Thomas & Battle PLLC

(57) ABSTRACT

A real-time interactive system and method for updating infrastructure information, and using the same to implement new changes to the infrastructure, can utilize a wireless enabled portable data collection device for capturing infrastructure information in the field at an access interface; an infrastructure information database containing previously recorded infrastructure information, if any; a remote server communicating with the portable data collection device and the infrastructure information database; wherein infrastructure information is wirelessly communicated to the remote server and the remote server controls a real-time interactive session with the portable data collection device to verify previously recorded infrastructure information, update the infrastructure information database with the current infrastructure information, and facilitate making the new changes using updated infrastructure information. The portable data collection device can be a cell phone having a camera, for capturing the images, and a GPS receiver, for obtaining GPS data associated with the access interface.

20 Claims, 28 Drawing Sheets

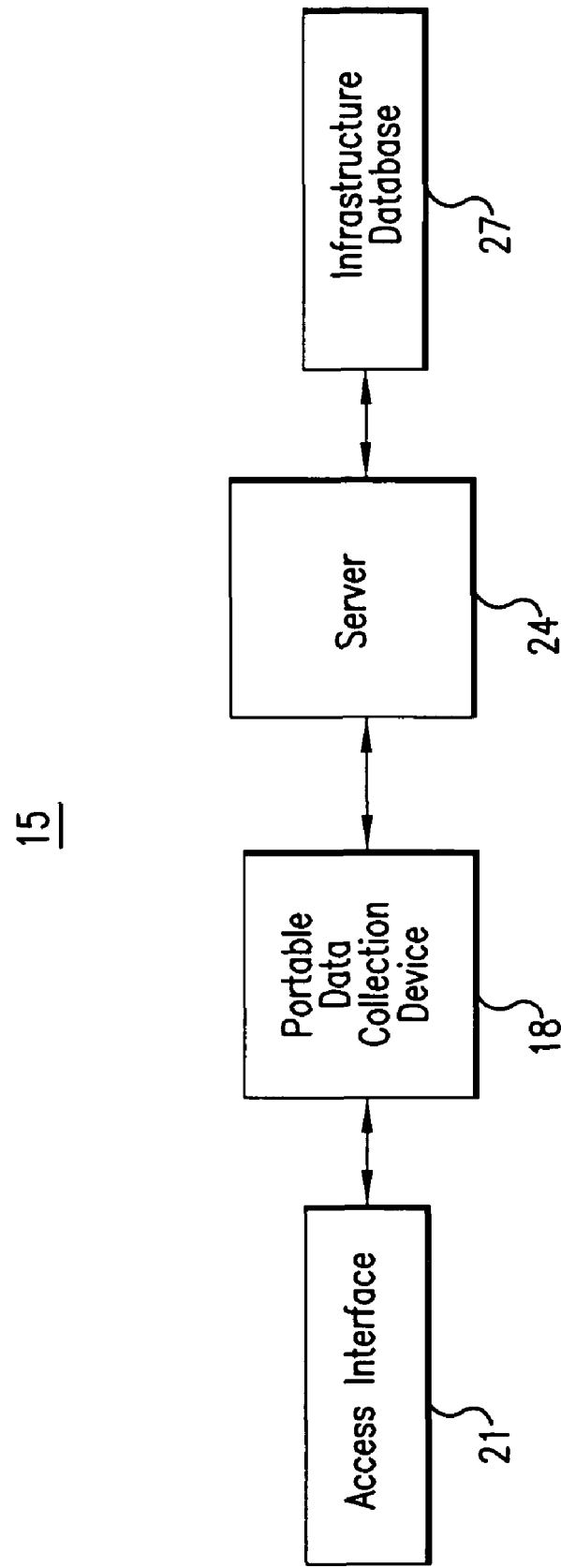

REAL-TIME INTERACTIVE SYSTEM AND METHOD FOR MAKING AND UPDATING CHANGES TO INFRASTRUCTURE DATA

BACKGROUND

The real time interactive system and method described herein relates generally to a system and associated method for making and updating changes to infrastructure data, and more particularly to a system utilizing a portable data collection device (PDC), a remote server, and an infrastructure database, in which the remote server controls a real time interactive session with the PDC to obtain currently indicated, and/or new changes, to infrastructure information associated with an in-field access interface, and accesses the infrastructure database to facilitate new changes to the infrastructure, as well as update, and/or verify information currently in the infrastructure database.

The system and method for making and updating changes to infrastructure data described herein according to the invention can be particularly suited to telecom and telephone cable infrastructure and issues, and adjacent industries which might have similar "infrastructure" issue. A key problem in the industry which is addressed by the presently described system and method is not a fault in the infrastructure, but rather is simply the need to efficiently collect, memorialize, and utilize the very latest changes occurring in the infrastructure due to routine service and recurring maintenance by service and repair technicians. The present manner of operation simply does not sufficiently record, memorialize and utilize all of the work and changes being made in the field in a timely manner which can have a significant ripple effect and impact on the business.

Telecom, utility (such as telephone & electrical) and cable TV network operators (as well as potentially any owner/operator of a large transportation and industrial infrastructure maintenance force requiring accurate status, geo location coordinates and maintenance records) could benefit from a system and method for making and updating changes to infrastructure data as described herein, because records data is key to accurate work orders and trouble tickets. Inaccurate data causes delays while the technicians determine the real situation, which in turn results in significant lost time, delayed or repeated repairs, delayed revenues, and impaired customer service. Service or repair time is lost, for example, in the case of telecommunications, by having to determine the initial subscriber wire or cable assignment is unusable, or to find, reassign and test a new wire pair; or to get the customer back in service, or to start the next job (potential delayed revenue).

Further using the telecommunications industry as an example, the "infrastructure," which can be referred to as "plant" and "outside plant" (or OSP), is comprised of lengths or sections of bundled wire pairs, or cables, spreading out with subsequent legs, a reverse tree infrastructure to reach homes. The cables can be as small as five pairs and as large as five hundred pairs or more. The sections are "spliced" where they join together, at a "service access interface," or simply "access interface," also referred to herein as "access points" (also sometimes called "cross boxes"). At these access points feeder cables are split to reach different parts of the assigned area. The access points can be large, where large count cables first break out to small cable sections, or small neighborhood "cross boxes" where the cables branch out yet again, or large aerial and/or subterranean terminals (which drop out wire pairs to subscribers), or pedestals serving a group of houses, or wire pin "blocks" which terminate wires serving smaller groups of subscribers or buildings. Of course a high-rise building can represent many hundreds of pairs, or telephone lines, representing considerable complexity.

Many technicians already record unreported, mismatched and faulted pair information by hand on the inside of the access interface/cross-box doors for the benefit of the next technician that may service that access interface. However, an access interface door simply is not a sufficiently reliable or efficient means to record or share this type information with others, to track problems (such as mis-assigned pairs) or resolve such problems, or to report the resolutions for the benefit of future service at the particular access interface. This updated information is valuable in that, if known, it would avoid wasted time working on a known but unreported bad pair, or trying to find the pair when it has been moved but unreported, or mis-assigned but unreported. Having the updated infrastructure information would also avoid wasted time to coordinate and reassign a new pair, which also affects facilities support personnel. This wasted time results in delays in completion of repairs, new service installation, and affects associated customer satisfaction, as well as revenues. The updated infrastructure information is thus extremely valuable to updating and maintaining plant records.

In addition to the telecommunications industry, the system and method described herein can also have potential applications in other industries, such as anywhere a service and maintenance force is required to maintain "infrastructure," including communications, vehicles, buildings, equipment, and the like. Such industries can include transportation (planes, trains and automobiles), utilities, livestock, and more, where up-to-date and accurate geo-location and status of "infrastructure" is critical to success of the business.

A system and method as described herein can provide a way to collect, report, and utilize updated infrastructure information, for example in the telecommunications industry, this includes the accurate location and status of access interfaces (e.g., cross-boxes and terminals), pair assignments (and mismatches), and unusable (unreported) pairs. Collection and updating of infrastructure information would result in more accurate dispatches, reduced "windshield time" (trying to locate access interfaces), faster service orders and repairs, and thus faster revenue capture.

Accordingly, there is a need for a system and method which can provide a solution to the problem of making and updating infrastructure information in a timely fashion.

SUMMARY

A real-time interactive system and method for updating infrastructure information and using such updated information to make new changes to the infrastructure can utilize a wireless enabled portable data collection device for capturing infrastructure information in the field at an access interface; an infrastructure information database containing previously recorded infrastructure information, if any, for the access interface; a remote server communicating with the portable data collection device and the infrastructure information database; wherein infrastructure information is wirelessly communicated to the remote server; and wherein the remote server controls a real-time interactive session with the portable data collection device to verify previously recorded infrastructure information is consistent with the current infrastructure information at the access interface, update the infrastructure information database with the current infrastructure information, and facilitate making the new changes using updated infrastructure information. In certain embodiments, the portable data collection device can be a cell phone having a camera, for capturing images at the access interface, and a GPS receiver, for obtaining GPS data associated with the access interface.

In further embodiments of the system, the server can include OCR software to convert the image to text, then extract the identifying information, and then initiate the real time interactive session with the portable data collection device by automatically requesting the previously existing infrastructure data from the database corresponding to the identifying information thus extracted. Alternatively, the portable data collection device can communicate the GPS data for the access interface to the server, which can be used as the identifying information, and the server can initiate the real time interactive session with the portable data collection device by automatically requesting the previously existing infrastructure data corresponding to the GPS data for the access interface.

A real time interactive method for updating infrastructure information and using updated infrastructure information to make new changes to the infrastructure can generally comprise capturing infrastructure information in the field at an access interface, by a portable data collection device; wirelessly communicating at least one of the current infrastructure information, the identifying information and new changes to a remote server; and obtaining, by the remote server, previously recorded infrastructure information, if any, for the access interface from an infrastructure database using the identifying information; and controlling, by the remote server, a real-time interactive session with the portable data collection device to update and/or make changes to the infrastructure. The infrastructure information can be any current infrastructure information associated with the access interface, identifying information corresponding to the access interface, and/or new changes made to the infrastructure information. The real-time interactive session can be controlled, by the server, to verify the previously recorded infrastructure information is consistent with the current infrastructure information at the access interface, update the infrastructure information database with the current infrastructure information if needed, facilitate making the new changes using such updated infrastructure information, and/or further update the infrastructure information database with the new changes.

Certain embodiments of the method can further comprise capturing an image of the current infrastructure information and/or the identification information at the access interface, and then wirelessly communicating the image to the server. In such embodiments, the method can further comprise converting the image to text, extracting the identifying information from the text, and initiating the real time interactive session by automatically requesting the previously existing infrastructure data corresponding to the identifying information.

Other embodiments of the method can also comprise obtaining GPS data associated with the access interface and using the GPS data to verify the identifying information associated with the access interface. As an alternative to the previously described embodiment using identifying information extracted from an image converted to text to initiate the real-time interactive session, an alternative embodiment of the method, wherein GPS data is obtained, can comprise using the GPS data as the identifying information, and initiating the real time interactive session by automatically requesting the previously existing infrastructure data corresponding to the GPS data for the access interface.

To the accomplishment of the foregoing and related ends, certain illustrative aspects of the system and method for making and updating changes to infrastructure data are described in the following description and drawing figures. These aspects may be indicative of but a few of the various ways in which the principles of the system and method for making and updating changes to infrastructure data may be employed, and which is intended to include all such aspects and any equivalents thereof. Other advantages and features of the system and method for making and updating changes to infrastructure data may become apparent from the following detailed description when considered in conjunction with the drawing figures.

BRIEF DESCRIPTION OF THE DRAWING FIGURES

A more complete understanding of the system and method for making and updating changes to infrastructure data can be obtained by considering the following description in conjunction with the accompanying drawing figures in which.

DESCRIPTION OF CERTAIN EMBODIMENTS

Telecom and cable TV infrastructure (amongst others) are subject to factors which cause them to break down, requiring regular service and maintenance. There is also regular service simply to add new and/or remove existing customers, or change the services of existing customers. All of this regularly exposes the "infrastructure" to the environment (allowing water/moisture ingress and breakdown such as corrosion, electrical shorts, ground faults), as well as to human error, of the service technician, including things like wiring the wrong pair, cross wiring to another pair, or "splits" (poor splice, etc.). In addition, the cables and plant break down with time due to the environment, which drives further repairs and maintenance, and thus resulting in further access by repair technicians. In an attempt to quickly deliver new services, service and repair technicians may make wire pair assignment changes, and "cut-over" or move the subscriber connection to a new and unused (but acceptable) wire pair, but may fail to report the maintenance status (latest infrastructure information) of the first wire pair or the change to the new pair. In which case future service changes or repairs to either wire pair will be inaccurate, and the subsequent technician must "sleuth" the real pair assignments and conditions through testing (which is very time consuming; hence the writing on the access point doors). As a result, this dynamic continually creates changes and physical problems, and if not effectively reported, creates a ripple-effect through subsequent repair orders and/or trouble tickets which increases the cost of service and maintenance.

Figure 11A:
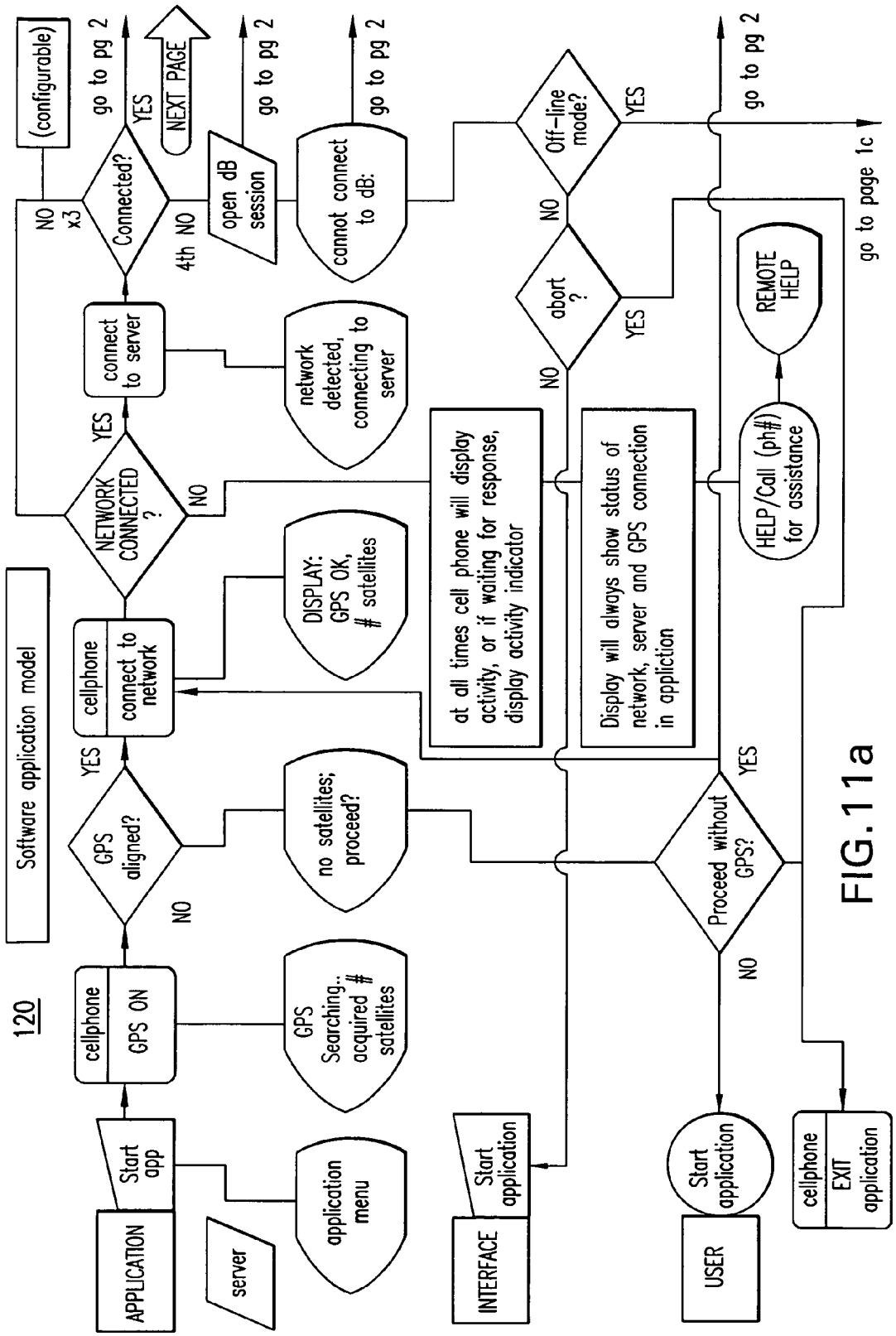
FIGS. 11A-11F are flow charts illustrating an embodiment of a software application model for a system of implementing and/or updating changes to infrastructure information.
Figure 11B:
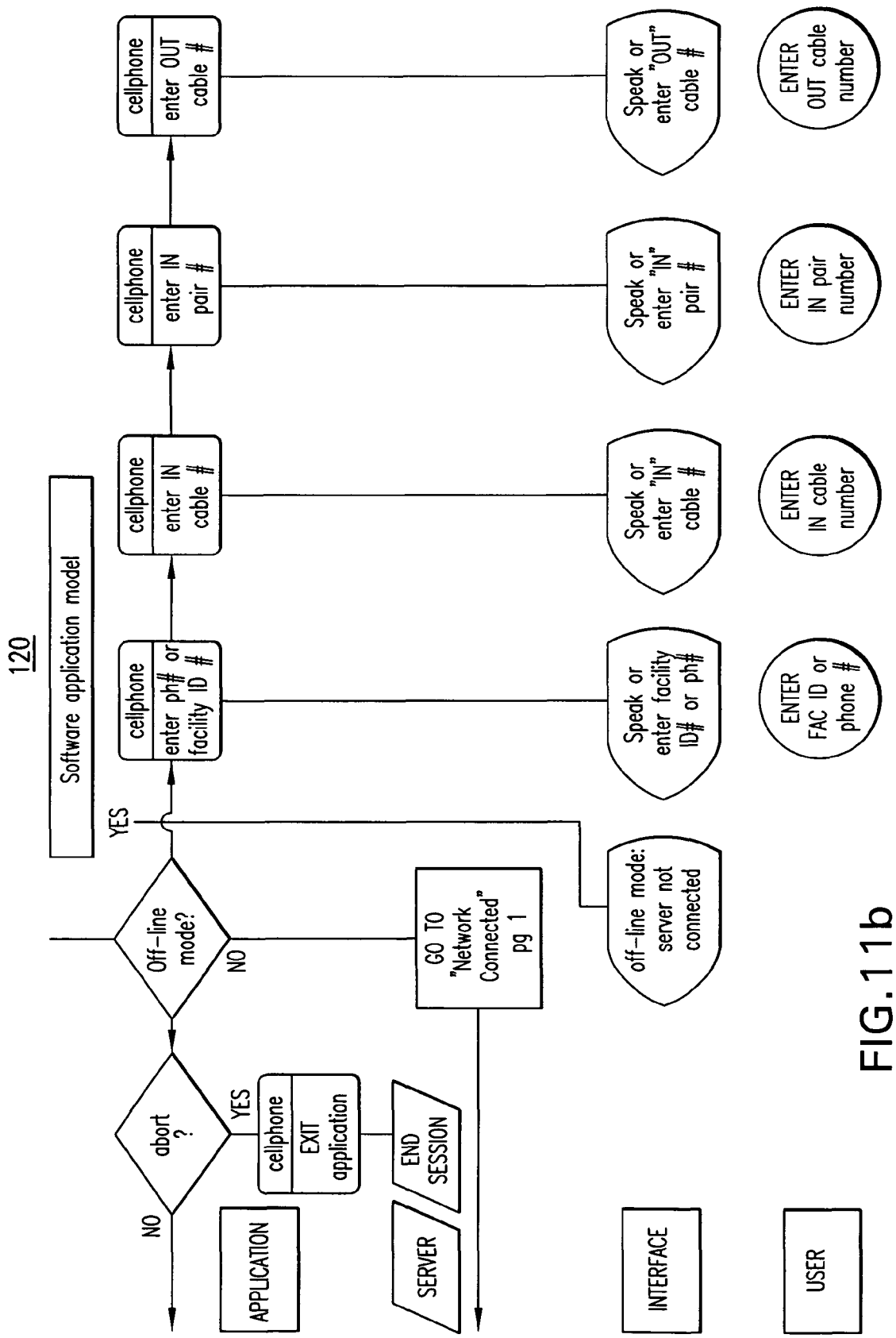
Figure 11C:
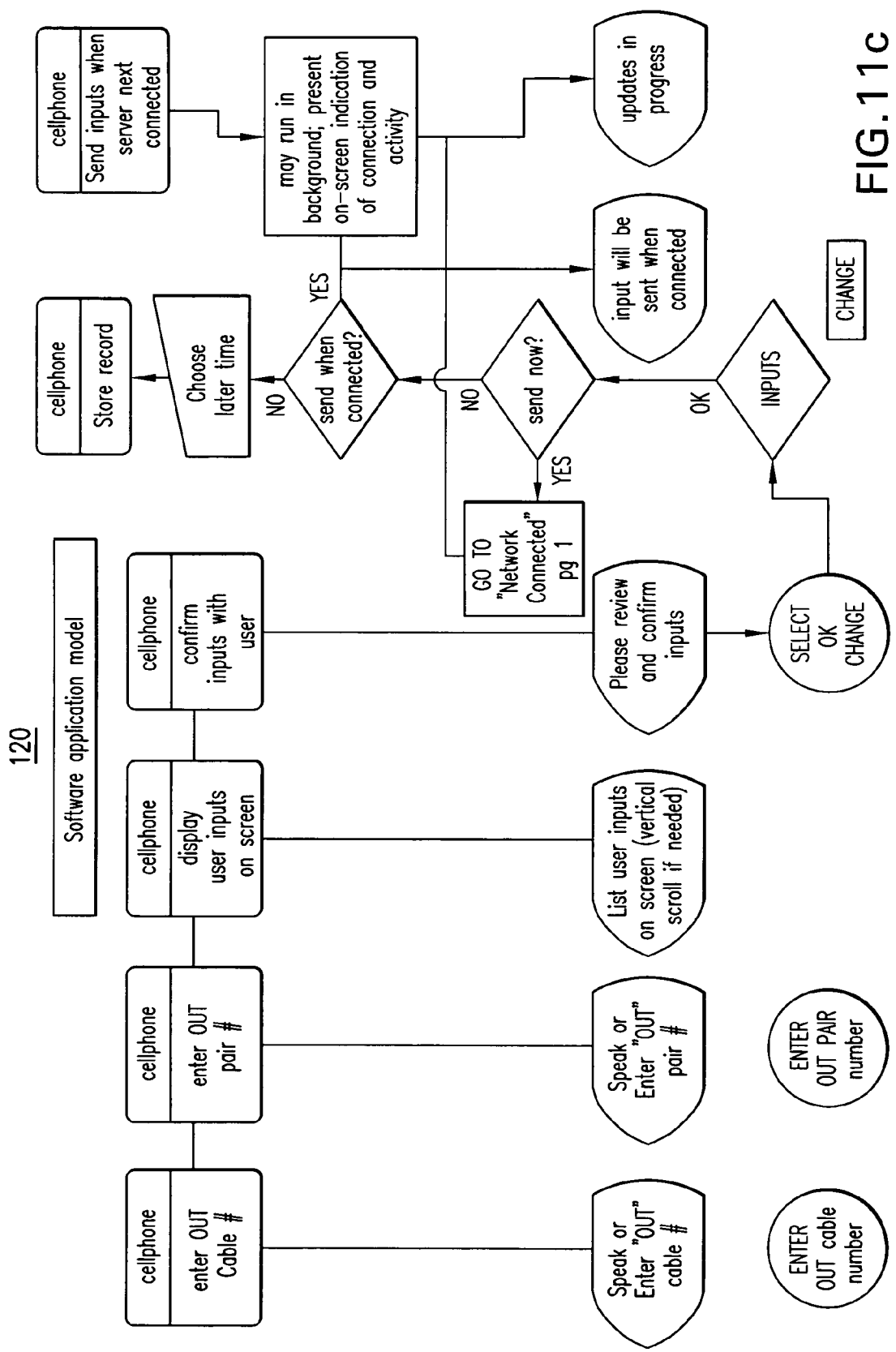
Figure 11D:
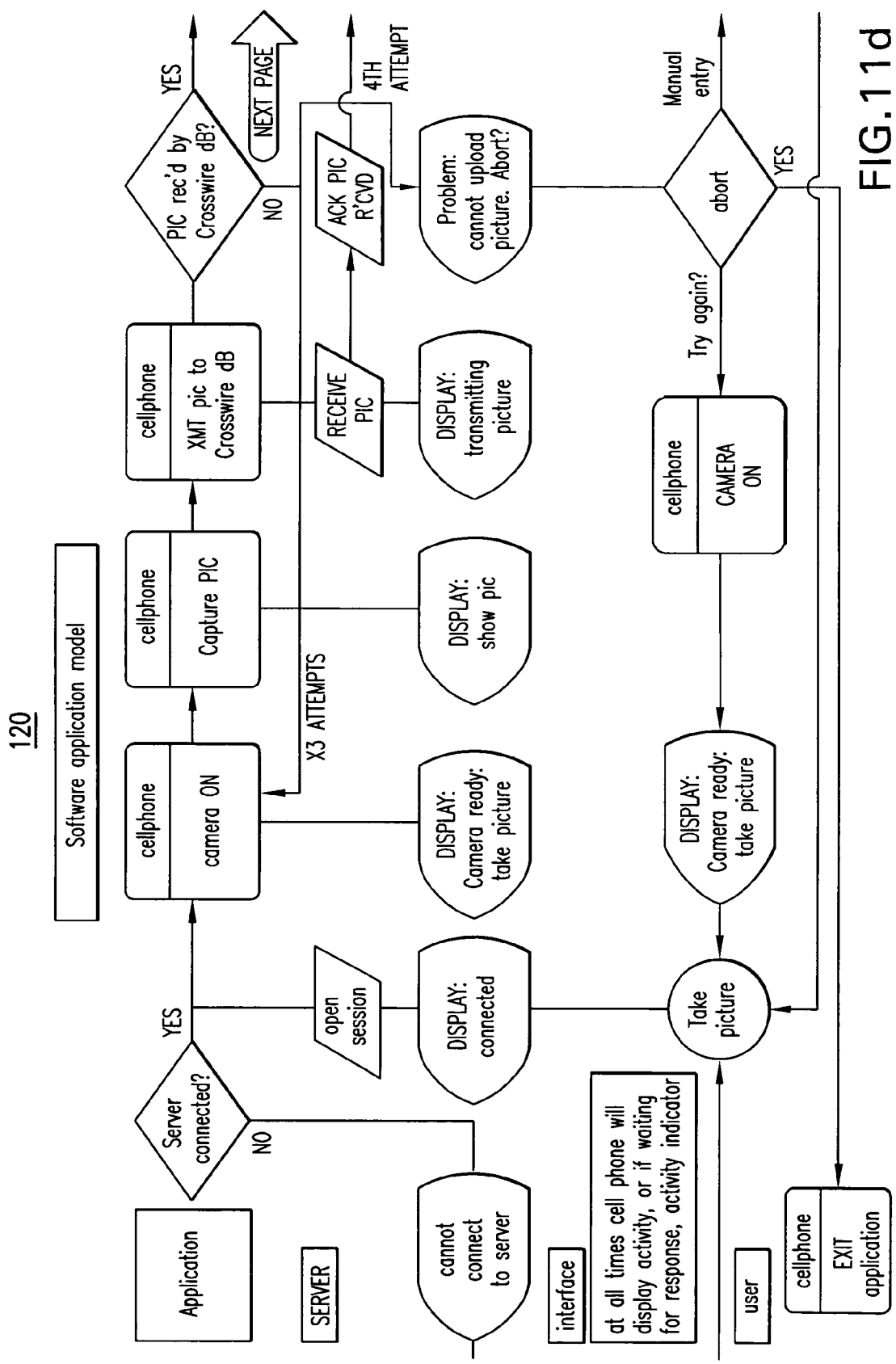
Figure 11E:
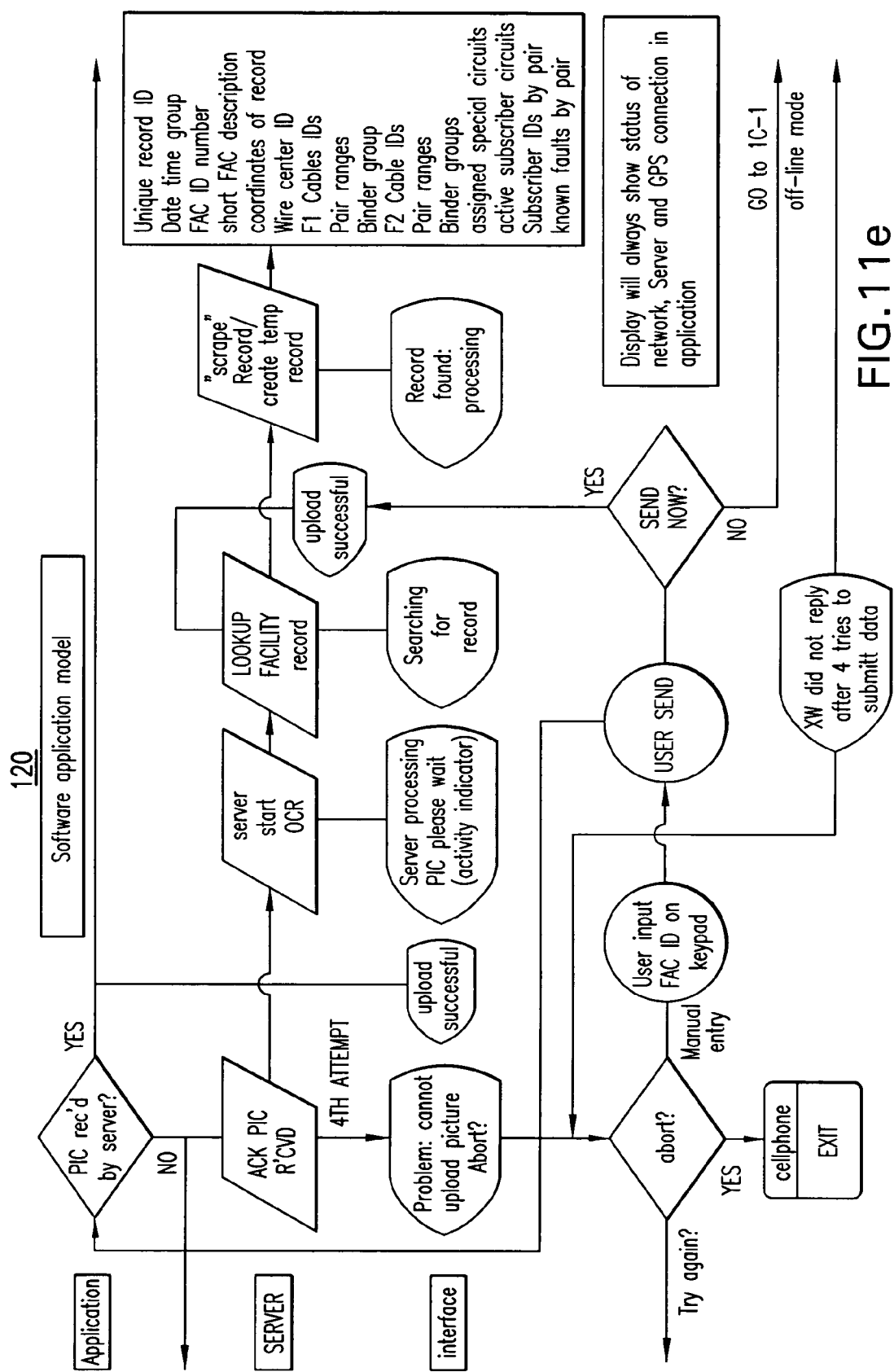
Figures 1, 11F:
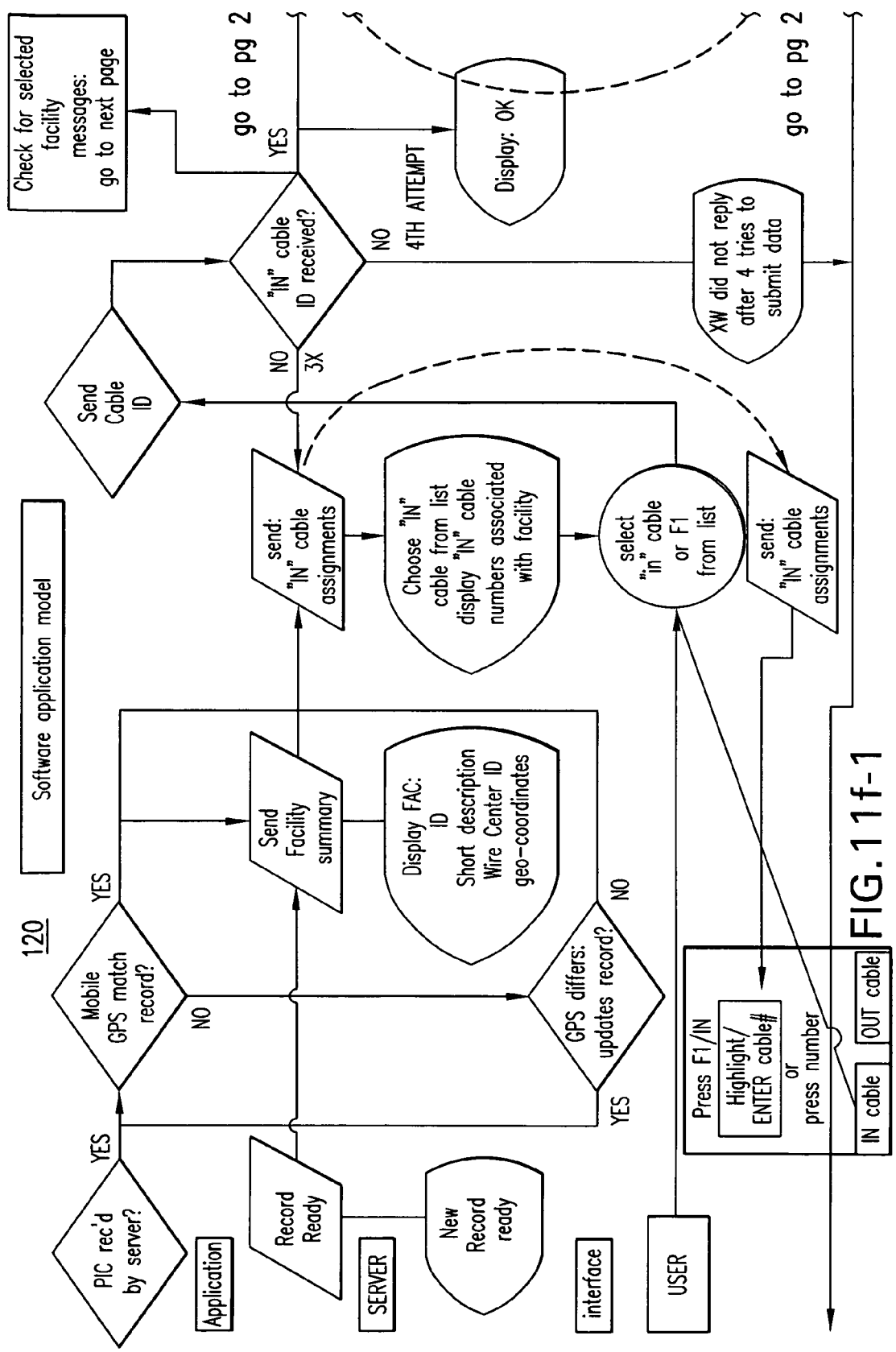
FIG. 1 is a block diagram of an embodiment of a system of implementing and/or updating changes to infrastructure information.
Figures 2, 11F:
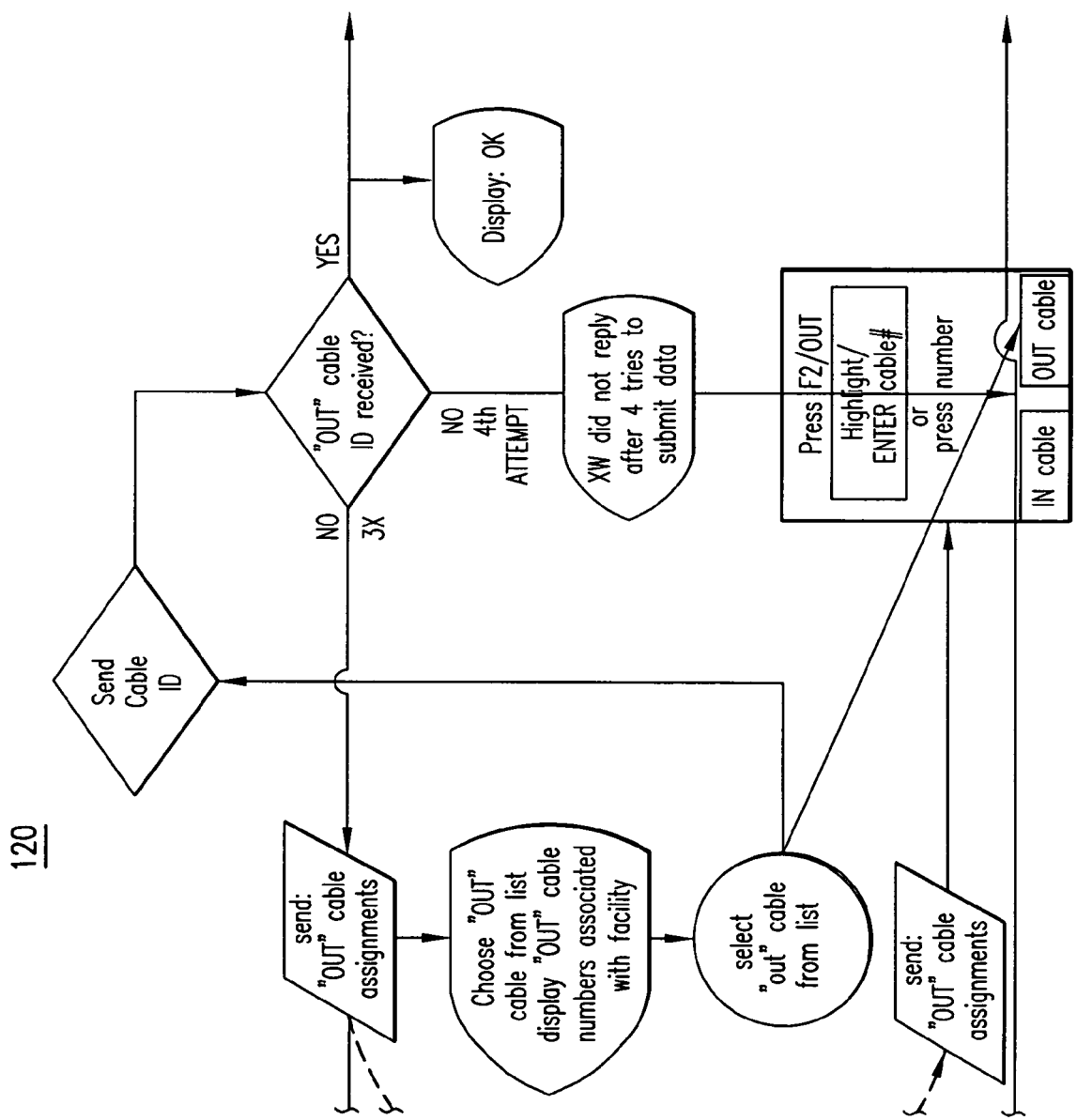
Figure 11G:
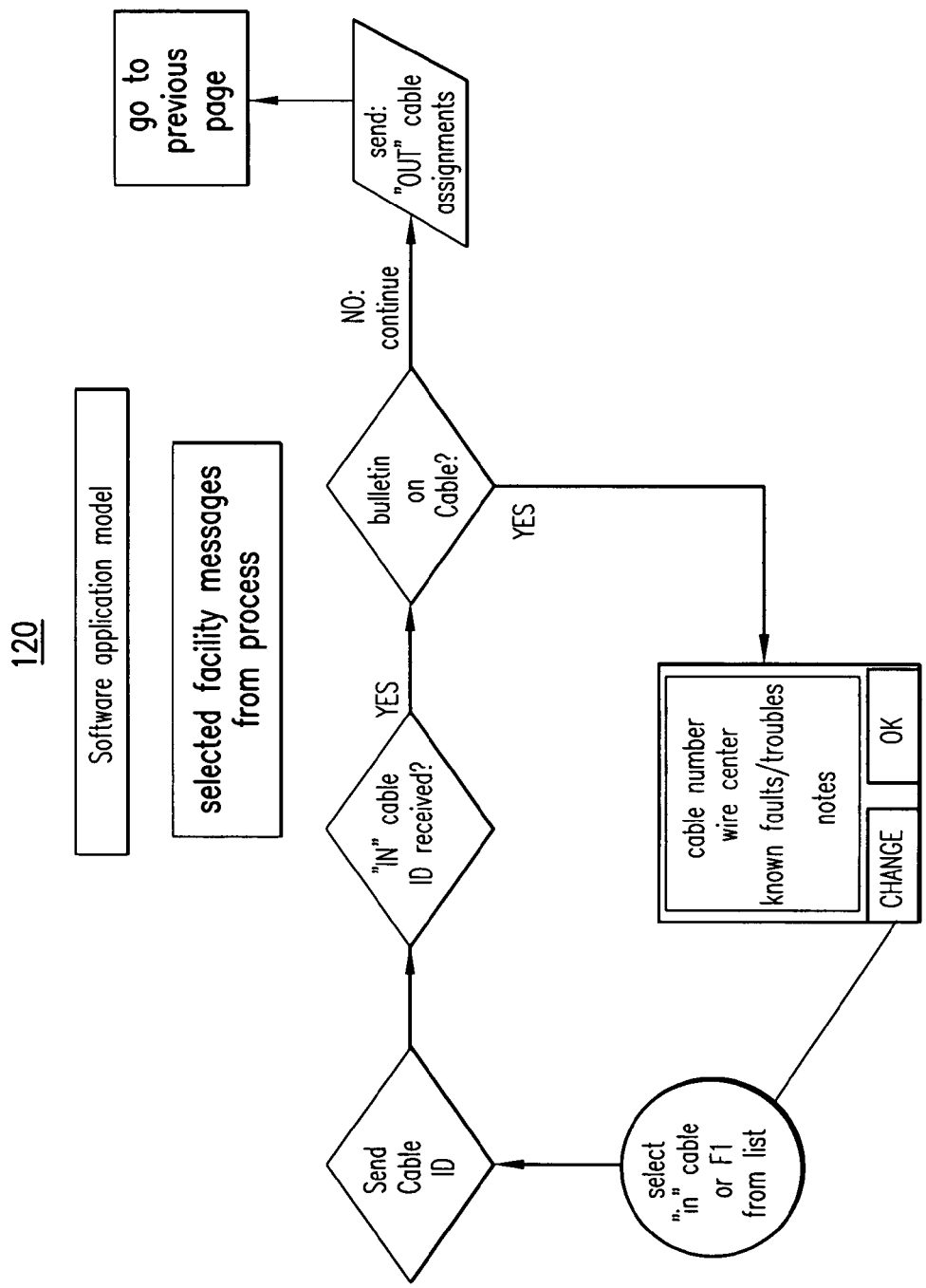
Figure 11H:
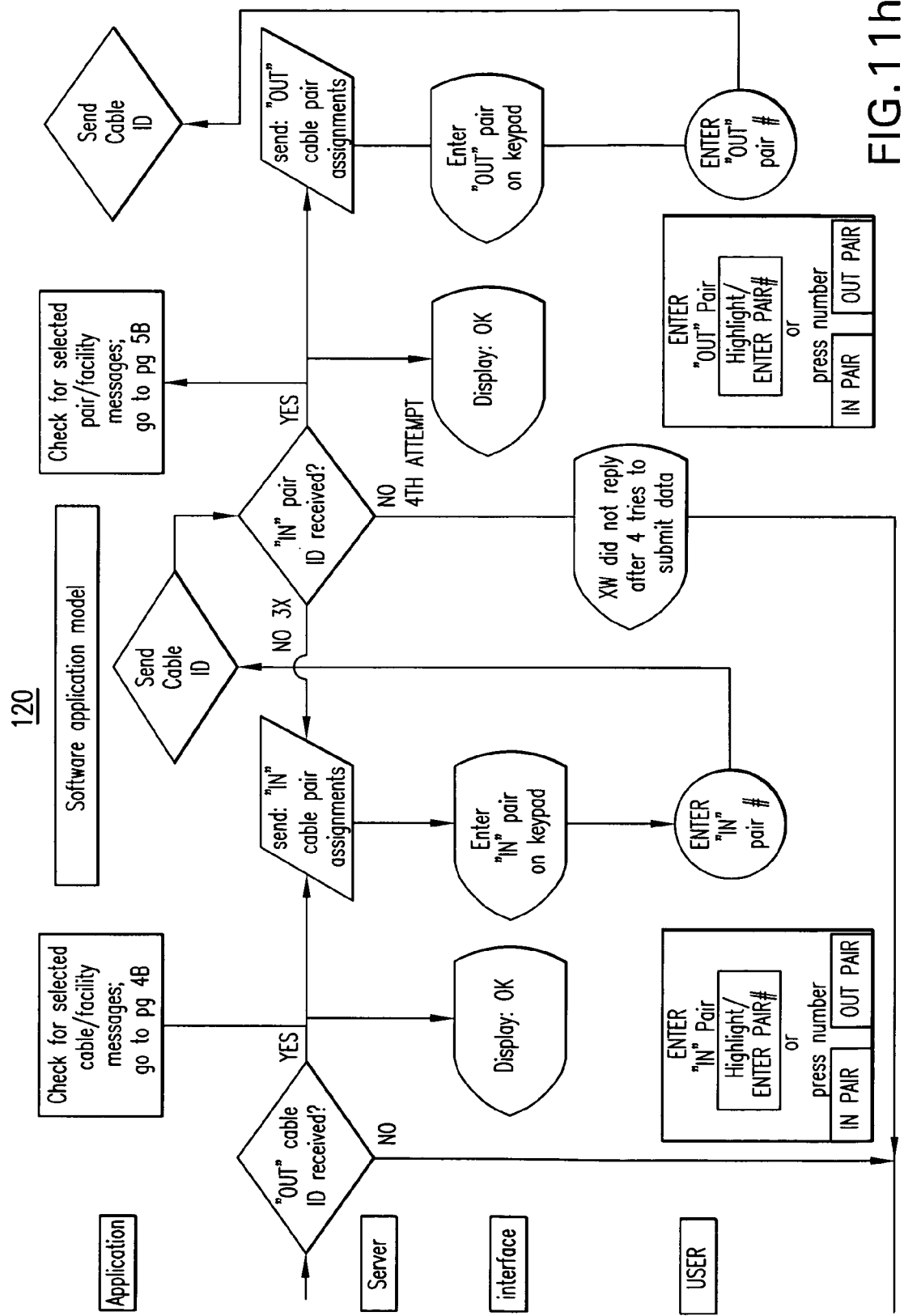
Figure 11I:
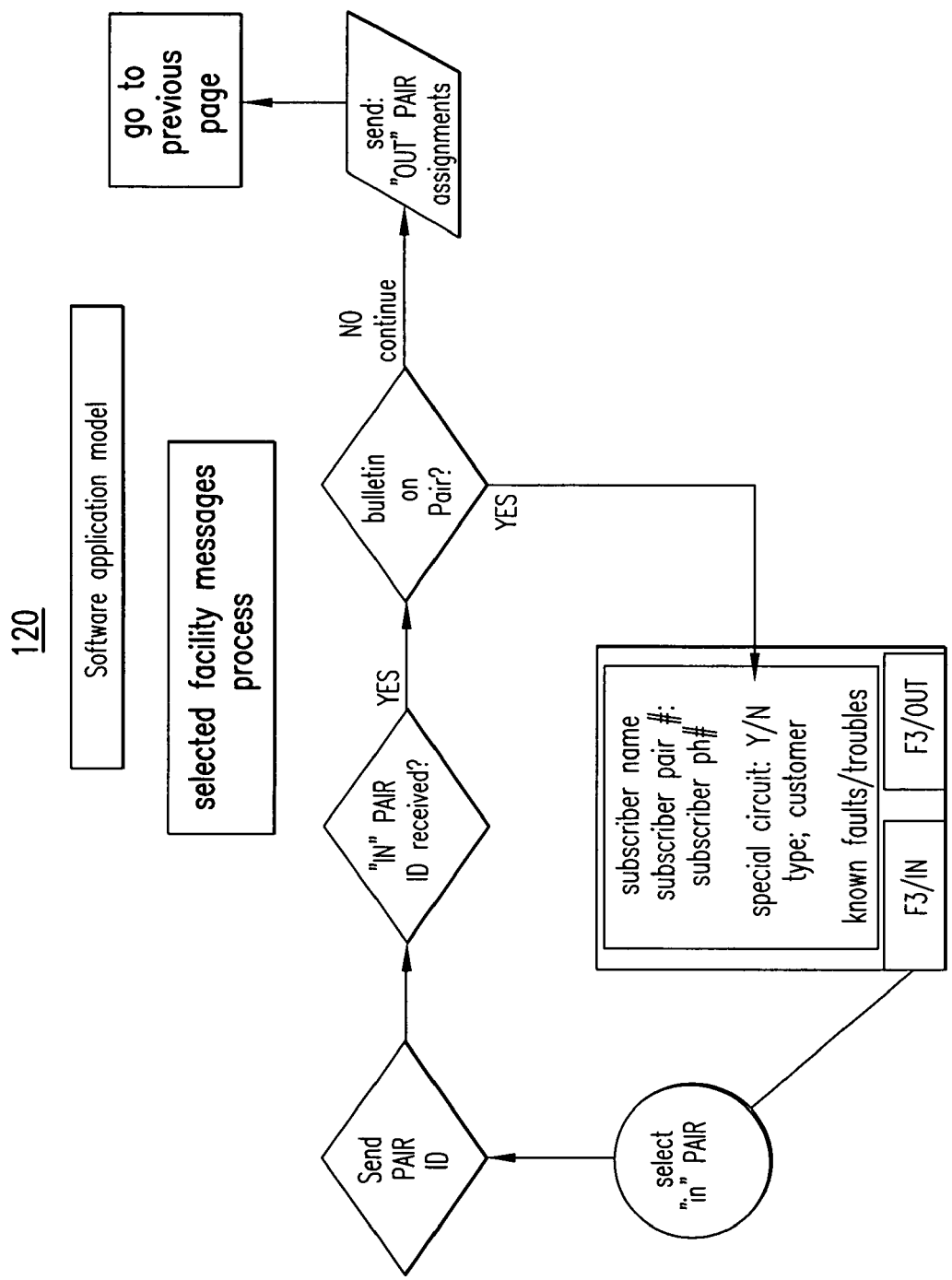
Figure 11J:
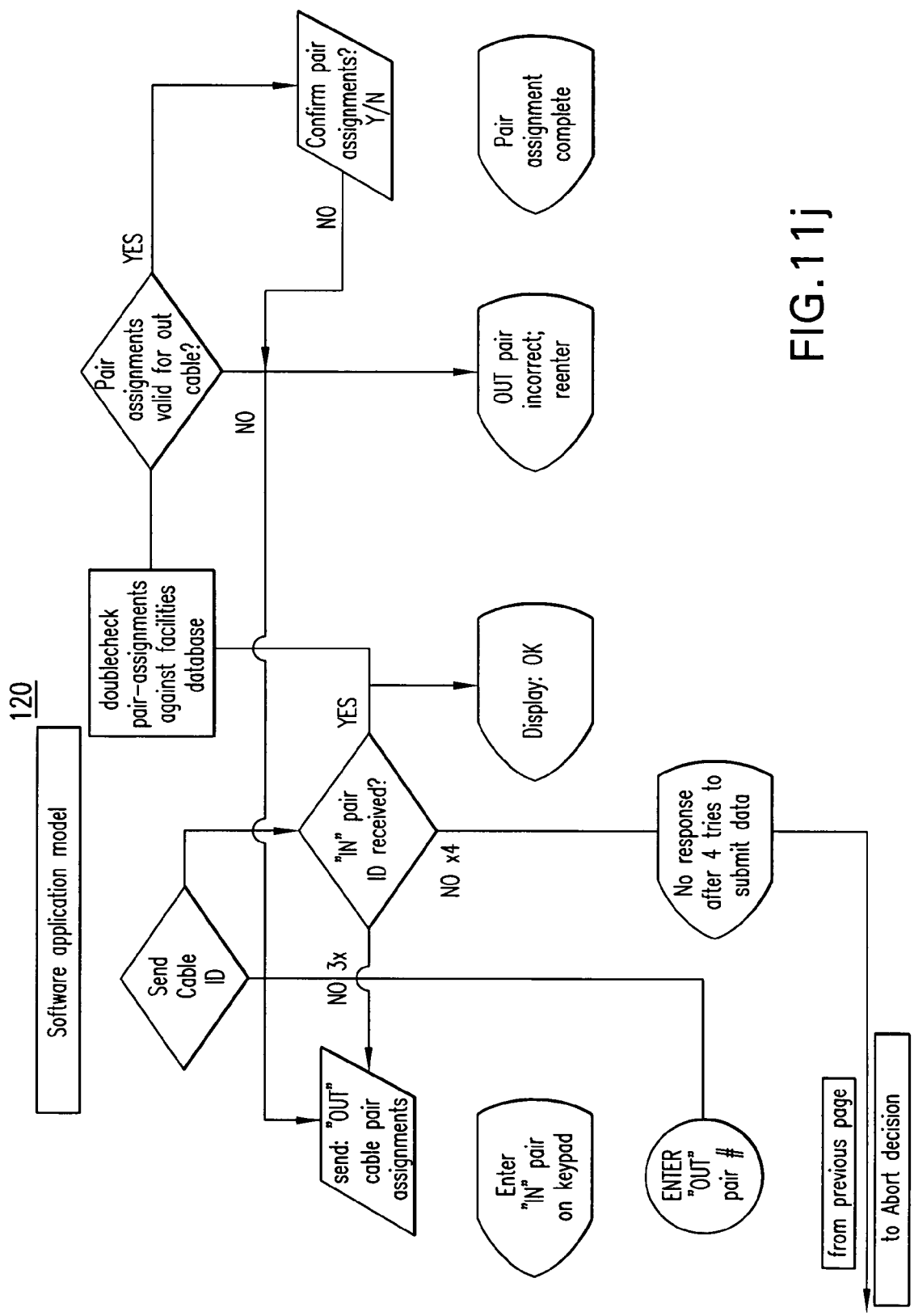

Referring now to the drawing figures, an basic embodiment of system 15 for making and updating changes to infrastructure data is illustrated in a FIG. 1, generally comprising a portable data collection device 18 which obtains infrastructure information associated with a particular access interface 21 in the field, and a remote server 24 that controls a real-time interactive session with the portable data collection device 18. The server 24 can communicate with an infrastructure database 27 which can contain previously recorded infrastructure data associated with the access interface 21, and can also update such database 27 with current information indicated at the access interface 21 and/or new changes made at the access interface 21.

Figure 2:
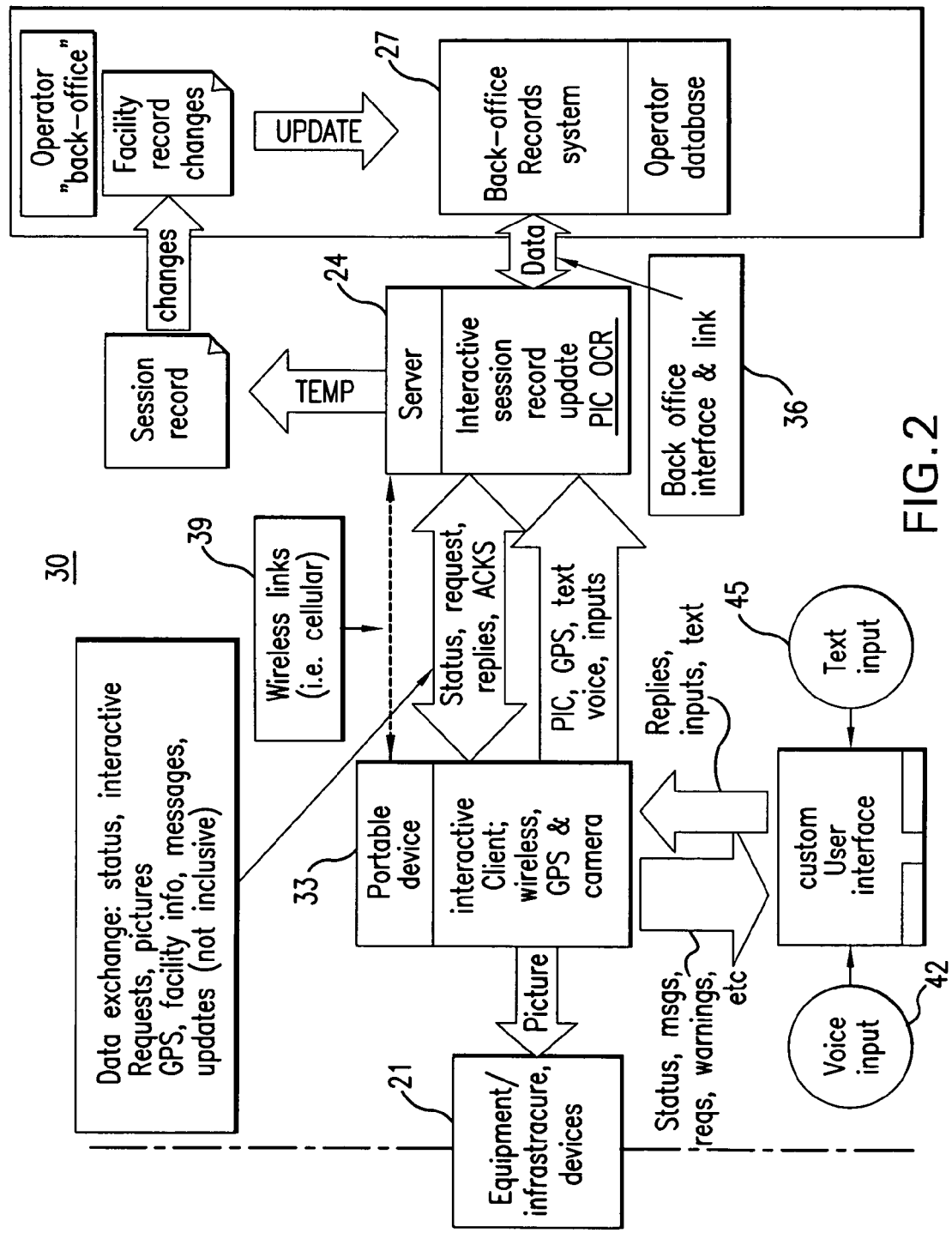
FIG. 2 is a flow diagram illustrating an embodiment of a system of implementing and/or updating changes to infrastructure information utilizing a commercially hosted server.
Figure 3:
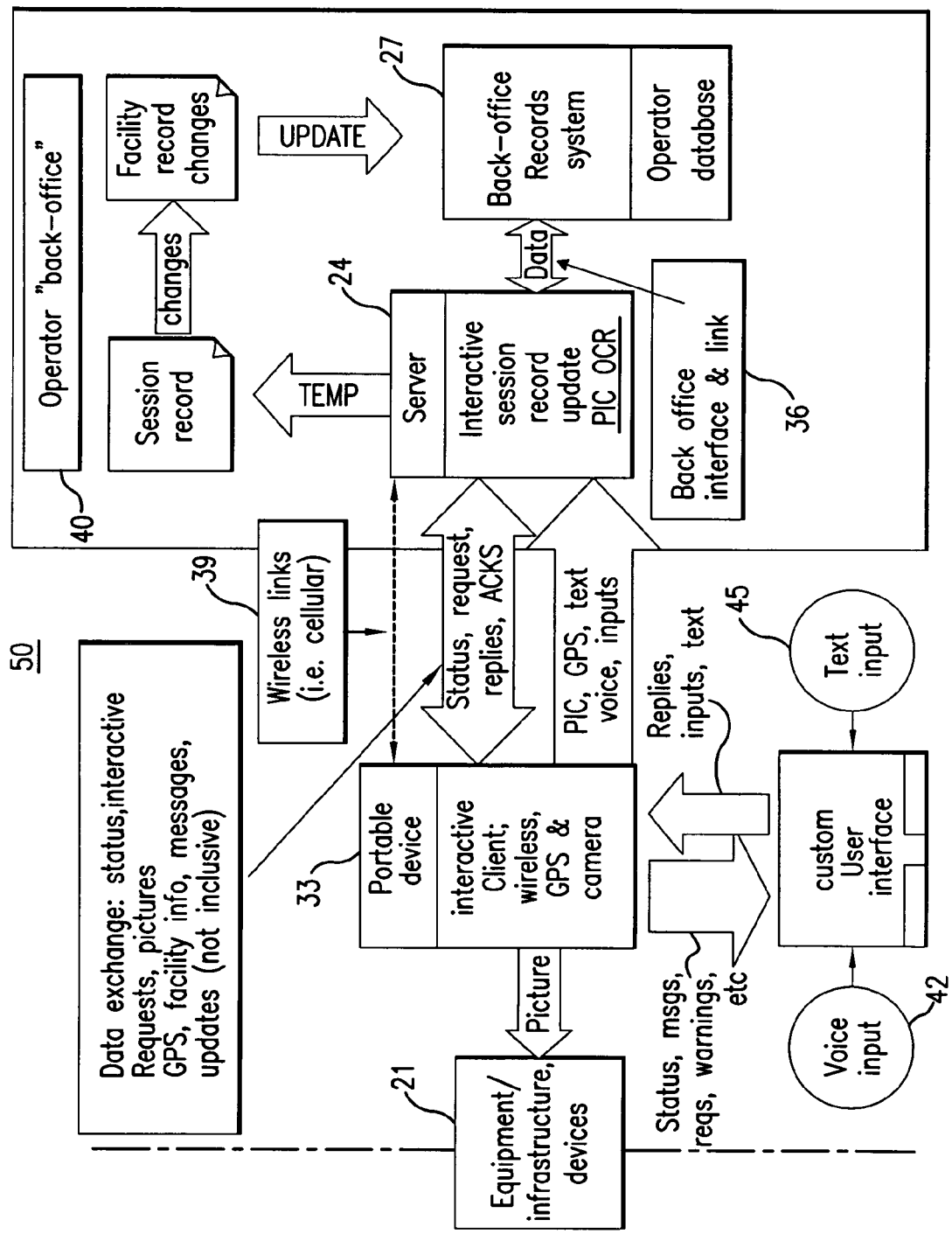
FIG. 3 is a flow diagram similar to the embodiment shown in FIG. 2 except utilizing an operator hosted server.
Figure 4:
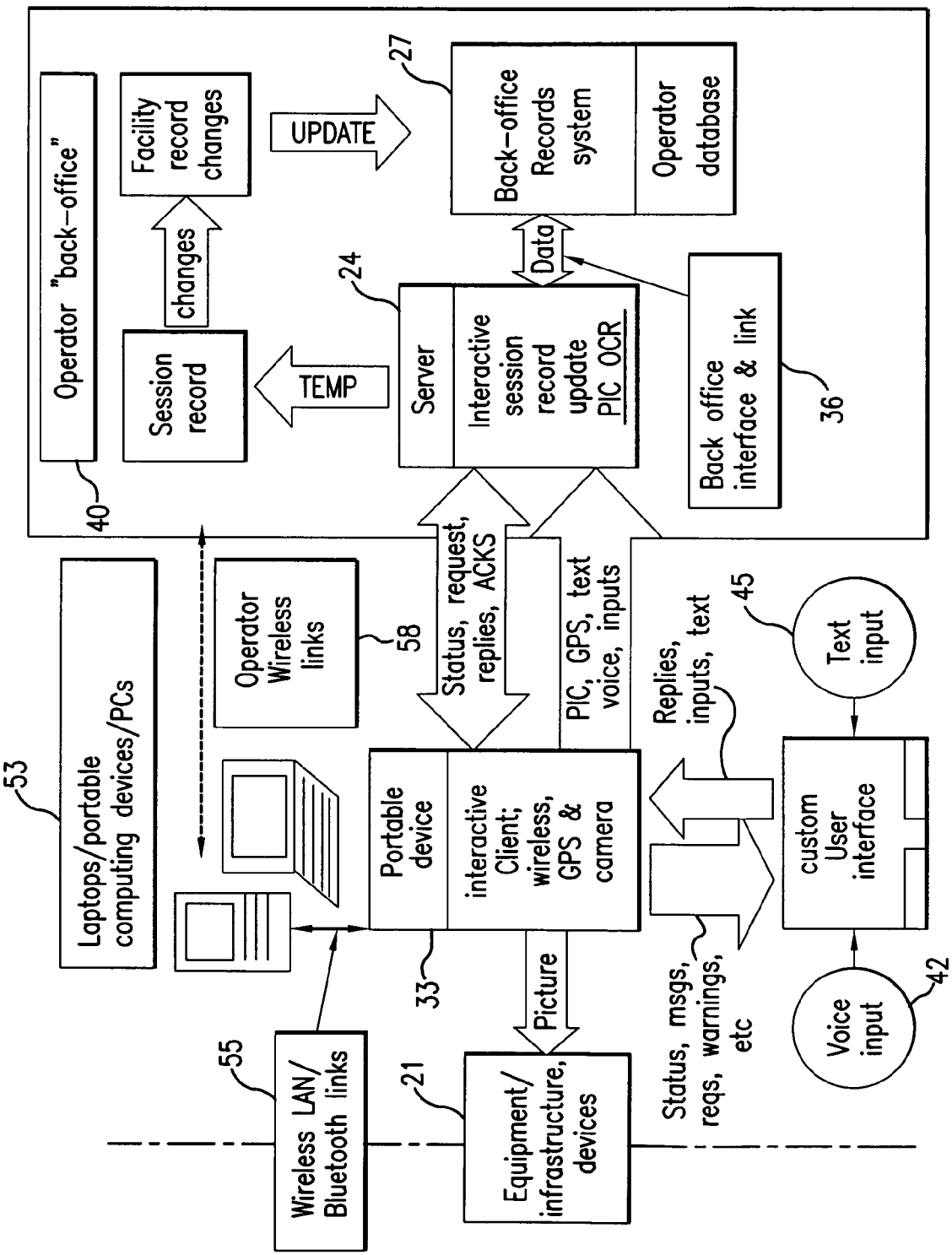
FIG. 4 is a flow diagram similar to the embodiments shown in FIGS. 2 and 3 except utilizing alternate "piggy-back" wireless links.

Referring to FIGS. 2 through 4, which provide more details in regard to the information exchange between a portable data collection device 33, server 24, and infrastructure information database 27 (also referred to in various drawing figures as "back-office records system" and/or "plant records data"), an embodiment 30 of a real-time interactive system for updating infrastructure information and using updated infrastructure information to implement new changes to the infrastructure, the system can generally comprise:
 a wireless enabled portable data collection device 33 for capturing infrastructure information in the field at the access interface 21, the infrastructure information comprising:
  any current infrastructure information associated with the access interface, identification information corresponding to the access interface, and
  new changes made to the infrastructure information;
 an infrastructure information database 27, the infrastructure database 27 containing previously recorded infrastructure information, if any, corresponding to the access interface 21 identification information;
 a remote server 24 communicating with the portable data collection device 33 and the infrastructure information database 27 via a suitable data network 36;
 wherein at least one of the current infrastructure information, the identification information, and the new changes are wirelessly communicated, via wireless links 39 to the remote server 24; and wherein the remote server 24 controls a real-time interactive session with the portable data collection device 33 to at least one of:
  verify the previously recorded infrastructure information is consistent with the current infrastructure information at the access interface 21,
  update the infrastructure information database 27 with the current infrastructure information if needed,
  facilitate making the new changes using updated infrastructure information, and further update the infrastructure information database 27 with the new changes.

It is to be understood that the "infrastructure" can comprise equipment, devices, etc.

In further embodiments, the portable data collection device 33 can further comprise a digital camera (not shown) or a scanning device (not shown) to capture an image of the current infrastructure information and/or the identification information at the access interface 21, wherein the digital camera or scanner can be integral with the portable data collection device 33, or connectable to it so as to transfer the images thereto. The portable data collection device 33 can further comprise a GPS receiver for obtaining GPS data associated with the access interface 21, and the GPS data comprise at least part of the identifying information.

The portable data collection device 33 can also accept voice 42 and text 45 inputs, as well as take pictures. The "operator back office" 40 can refer to those operator information and data systems that store, serve and provide infrastructure records and associated information, as well as interoperate with other operator systems such as automated dispatch and information reporting, to provide services and information to other systems and users.

FIGS. 2 through 4 can be essentially the same with respect to the components of the system, except that FIG. 2 illustrates a commercially hosted server, FIG. 3 illustrates an operator hosted server, and FIG. 4 illustrates an operated hosted server with "piggy-back" wireless links (i.e., 55 and 58) from the portable data collection 33 device to a laptop/portable computing device/PC 53, and thence to the server 24.

Although FIGS. 2 through 4 refer to "GPS & camera" in association with the "portable device 33," it is to be understood that both of these listed features are not required to be part of the portable data collection device 33. Moreover, in general, it is to be understood that any/all features listed in any of the drawing figures, i.e., FIGS. 1 through 11j, in association with any illustrated diagrams or flowcharts of the system and method, are not necessarily included in each and every embodiment of the invention. Specifically, that various combinations of different features can constitute different embodiments of the invention, as set forth more particularly in the appended claims.

Figure 5A:
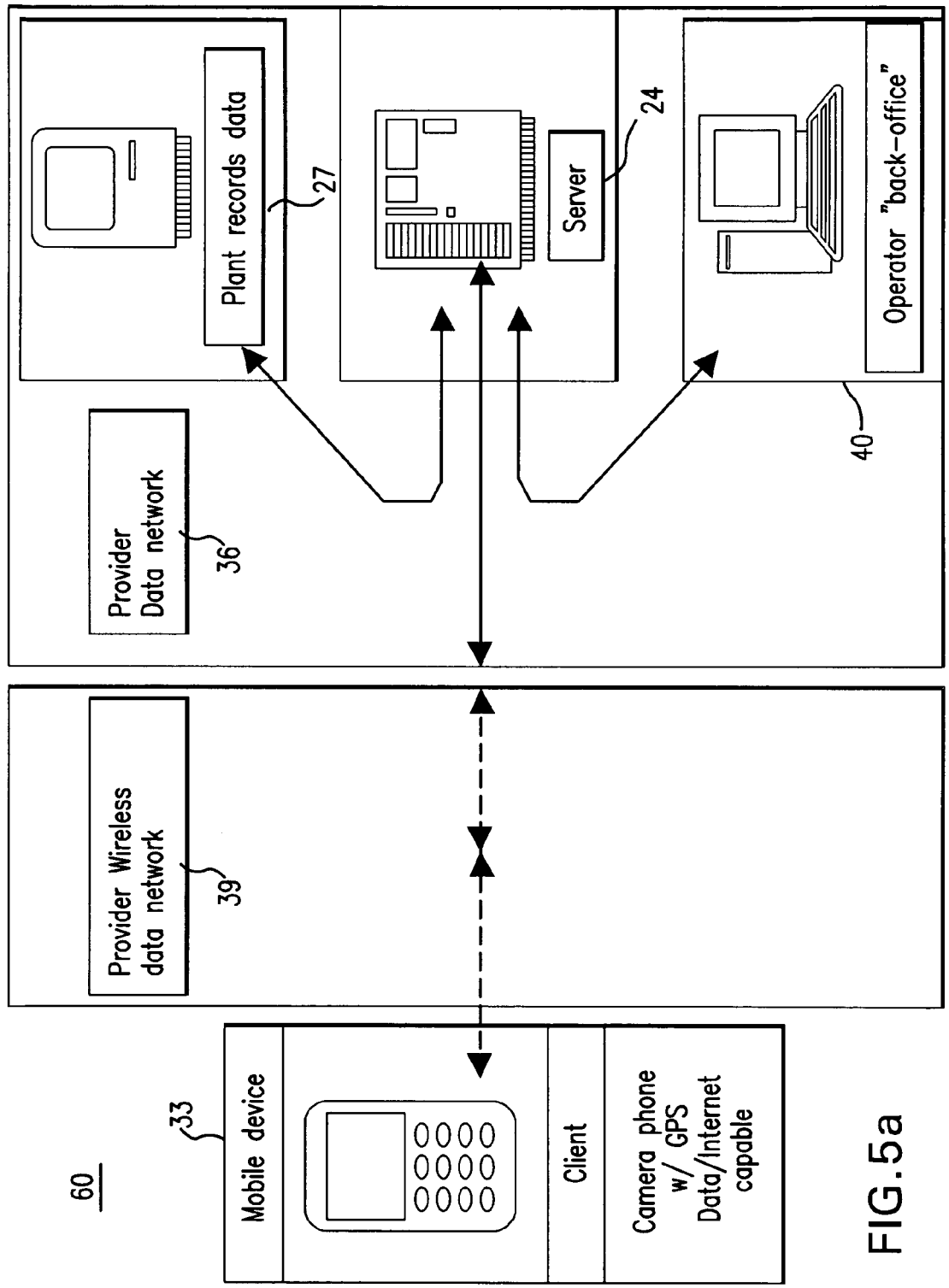
FIGS. 5A and 5B illustrate embodiments of a system of implementing and/or updating changes to infrastructure information utilizing a cell phone based client.
Figure 5B:
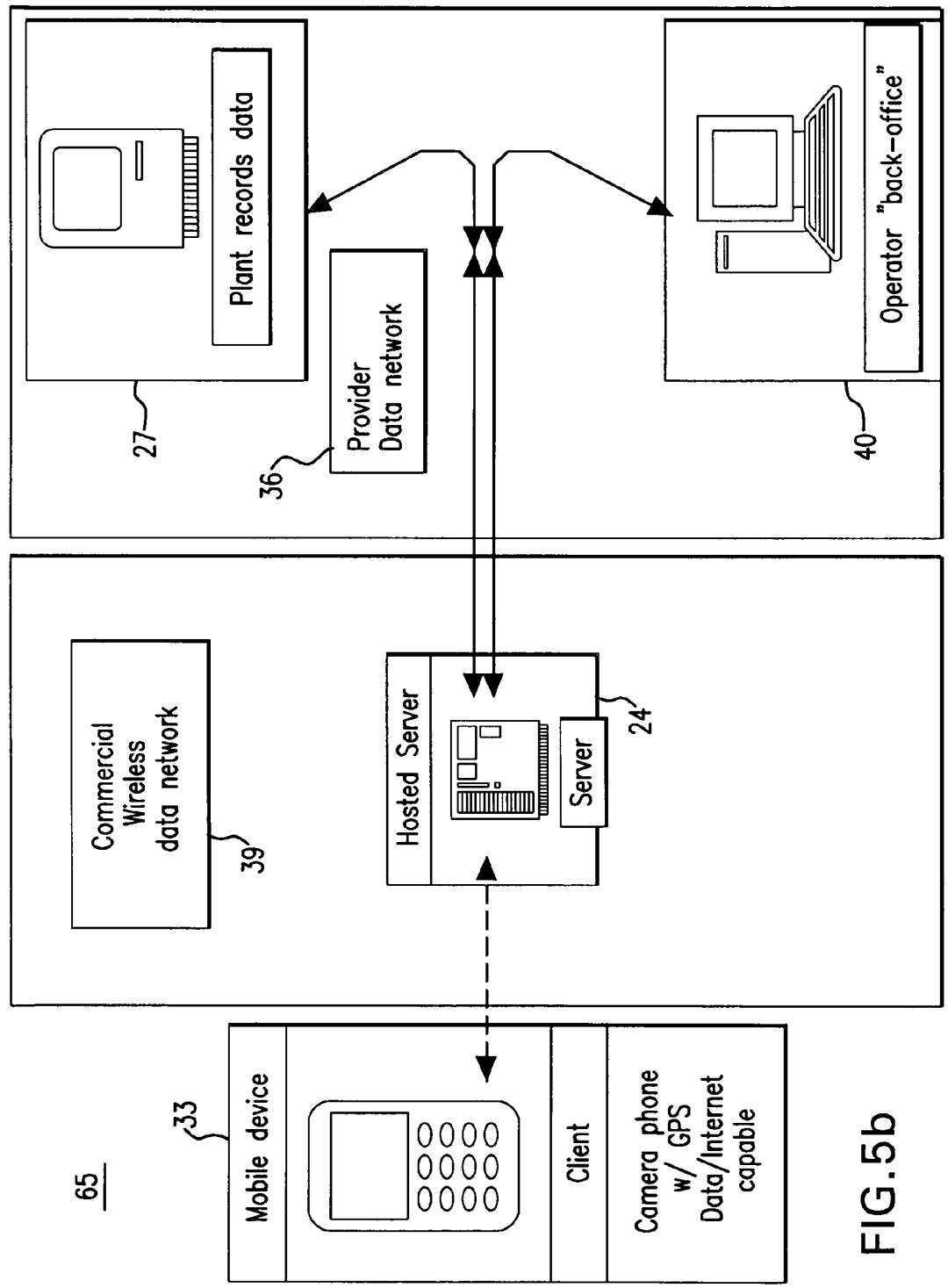
Figure 6A:
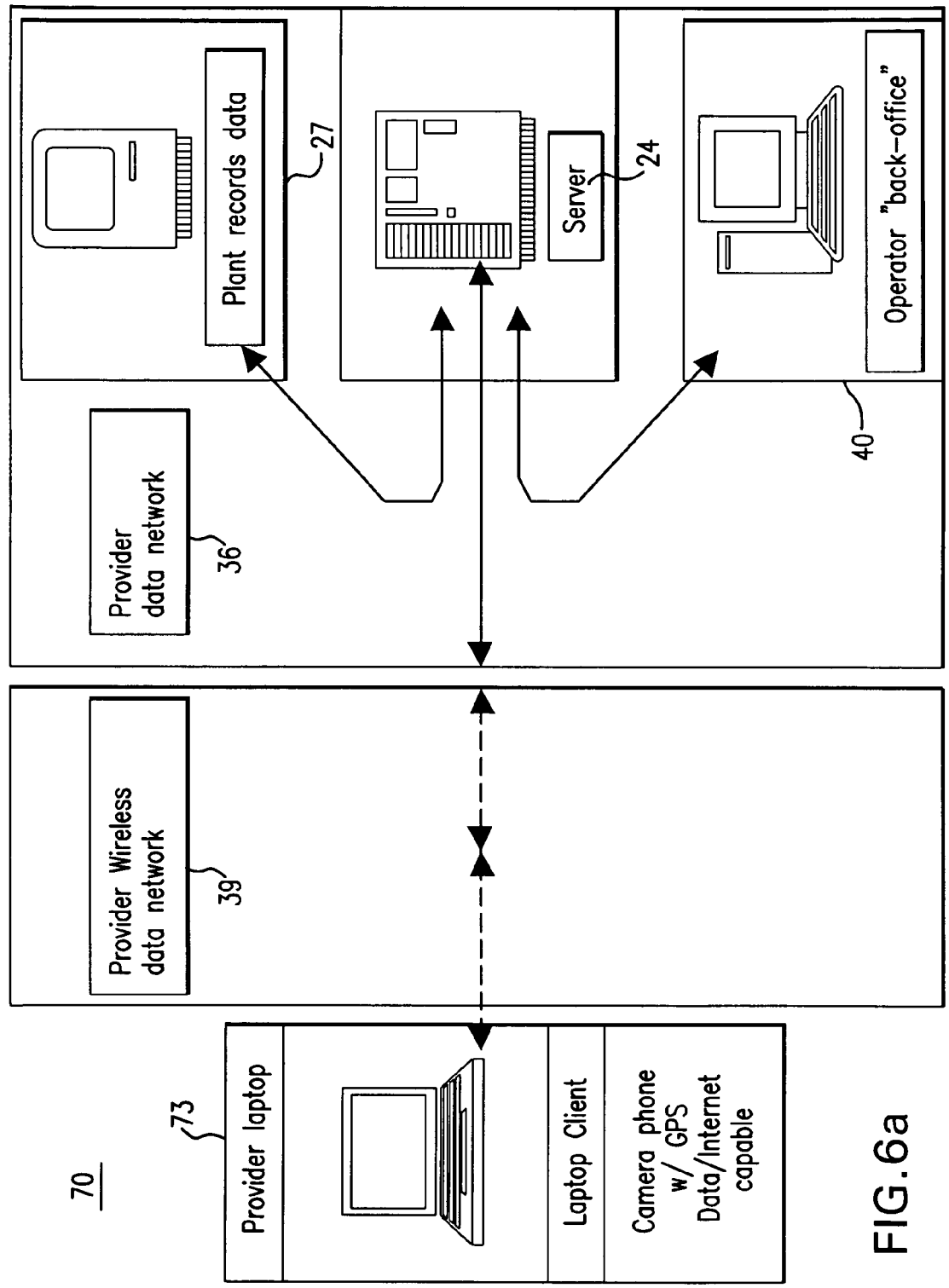
FIGS. 6A and 6B illustrate embodiments of a system of implementing and/or updating changes to infrastructure information utilizing a laptop/PC based client.
Figure 6B:
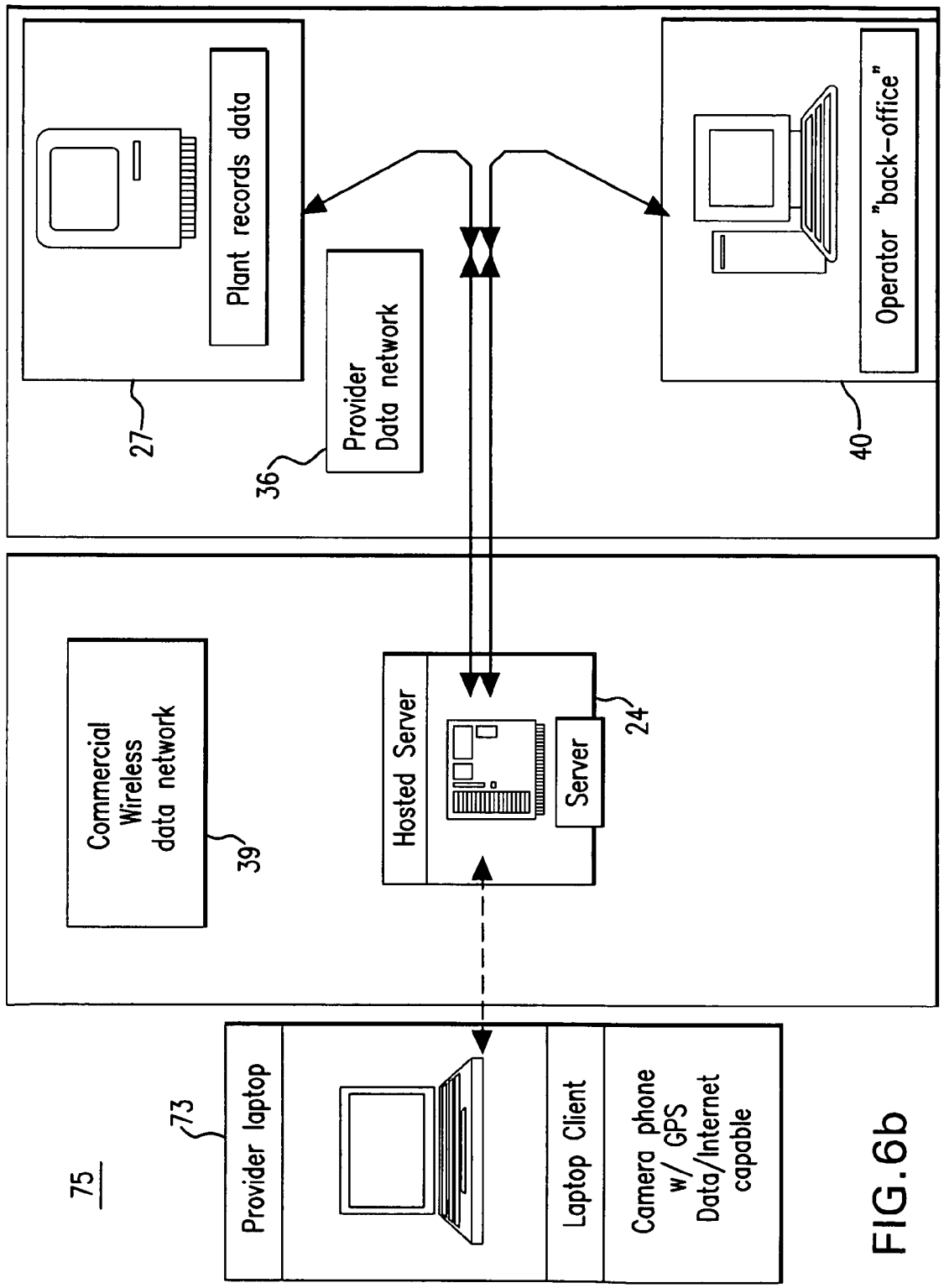

Referring the embodiments shown in FIGS. 5a and 5b, the portable data collection device 33 (also referred to as a "mobile device"), in which the "client" resides, can comprise a cell phone with a camera for capturing the images, and a GPS receiver for obtaining GPS data associated with the access interface (not shown). FIG. 5a illustrates an embodiment of a system 60 using a provider hosted server, whereas FIG. 5b illustrates an embodiment of a system 65 using an operator hosted server and utilizing a cell phone camera, as shown in FIGS. 6a and 6b.

Figure 7A:
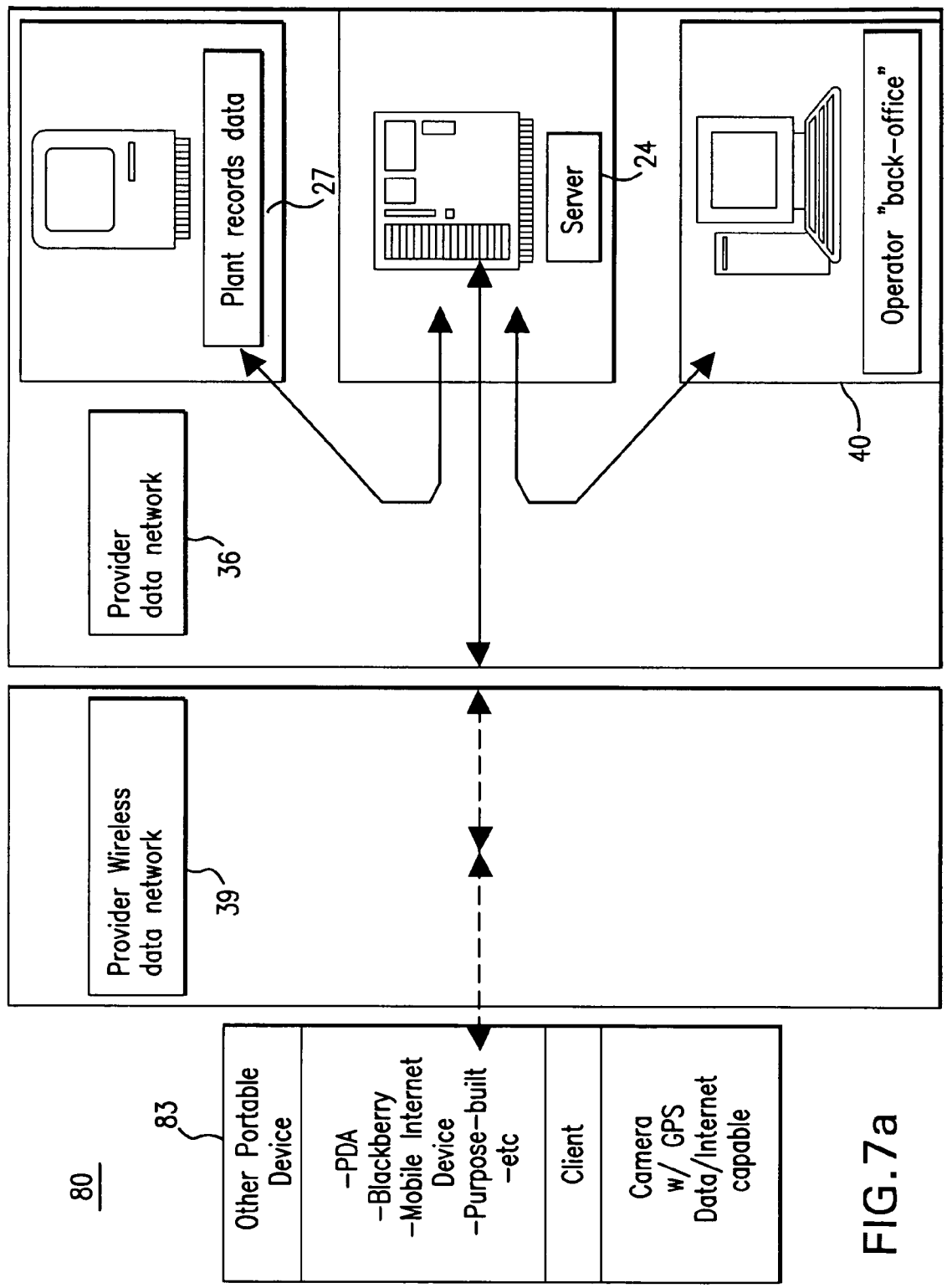
FIGS. 7A and 7B illustrate embodiments of a system of implementing and/or updating changes to infrastructure information utilizing other types of portable devices as the client.
Figure 7B:
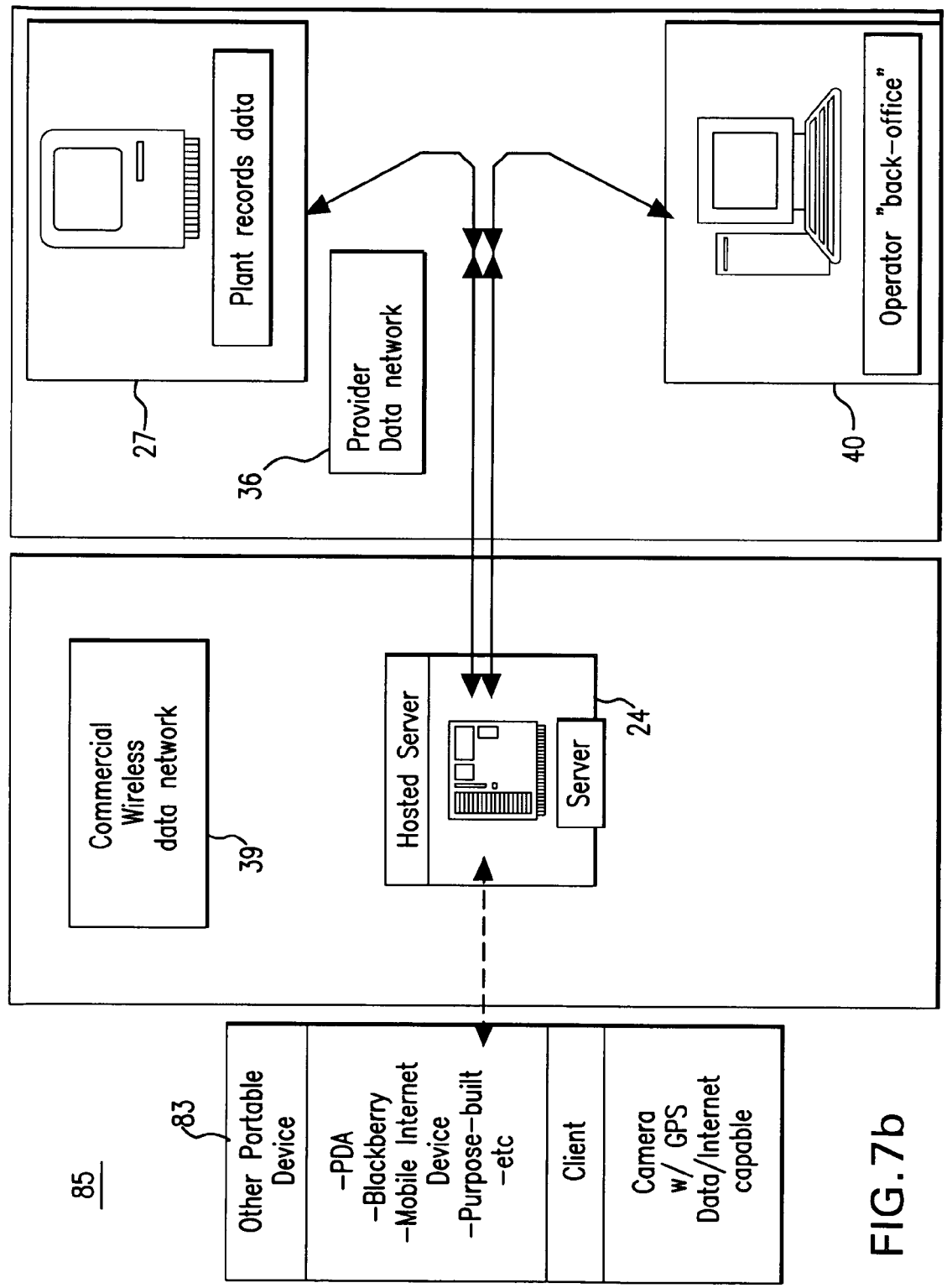

In this disclosure, the term "client" refers to a custom software interface which resides (runs on) the portable collection device 33, and which interacts with a custom software application running (residing) on the remote server 24 that controls the real-time interactive session with the portable data collection device 33, and also accesses/updates the infrastructure database 27. Another embodiment of a portable data collection device 73 can comprise a laptop computer in which the client resides. Similarly, in other alternative embodiments, such as shown in FIGS. 7a and 7b, a portable data collection device 83 in which the client resides could also comprise a PDA, Blackberry, micro-PC, or PMP, wireless Internet device, iPhone, or other similar portable computing device.

Figure 8A:
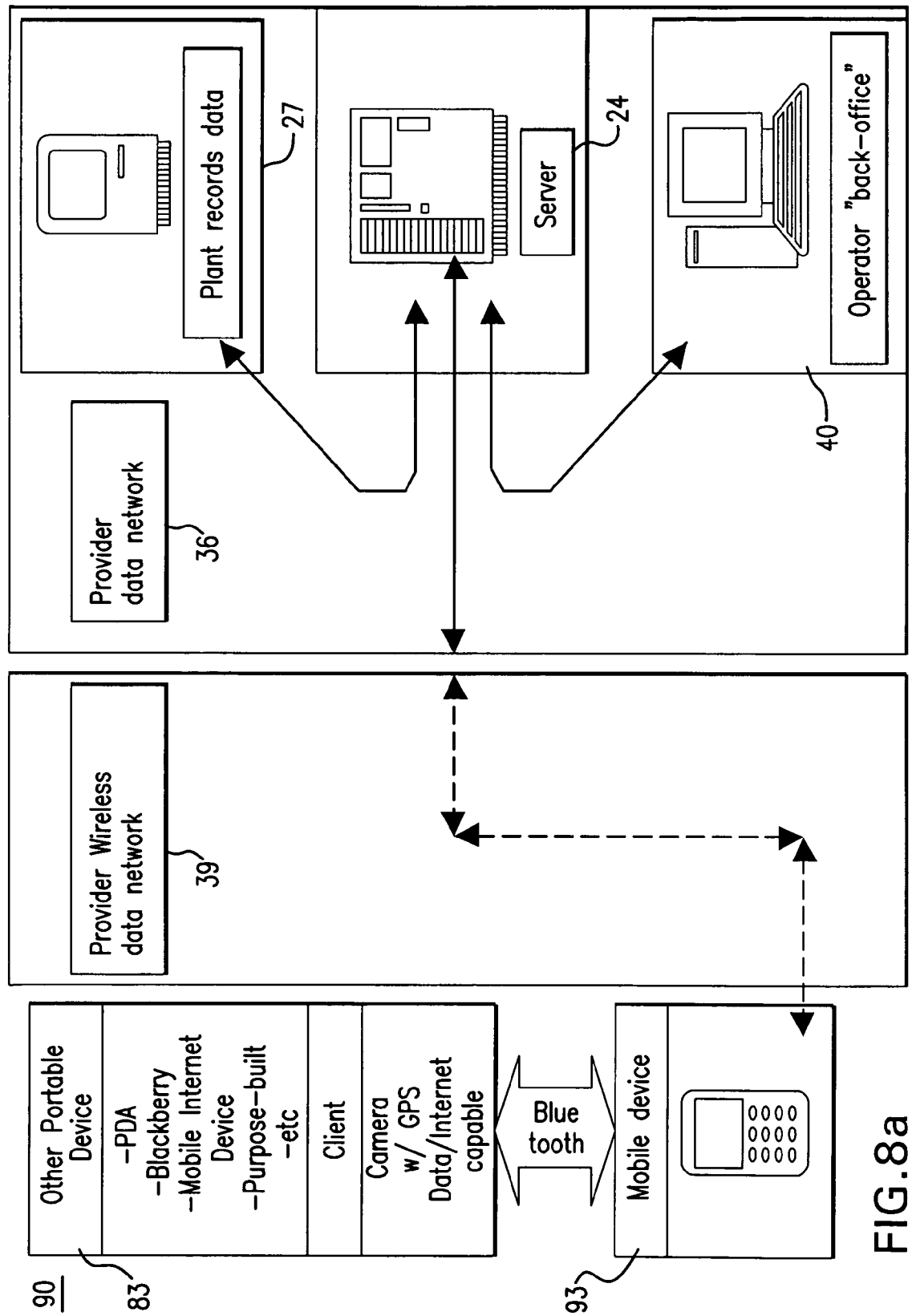
FIGS. 8A and 8B illustrate embodiments of a system of implementing and/or updating changes to infrastructure information utilizing a cell phone connected to other types of portable devices to provide an alternative wireless link.
Figure 8B:
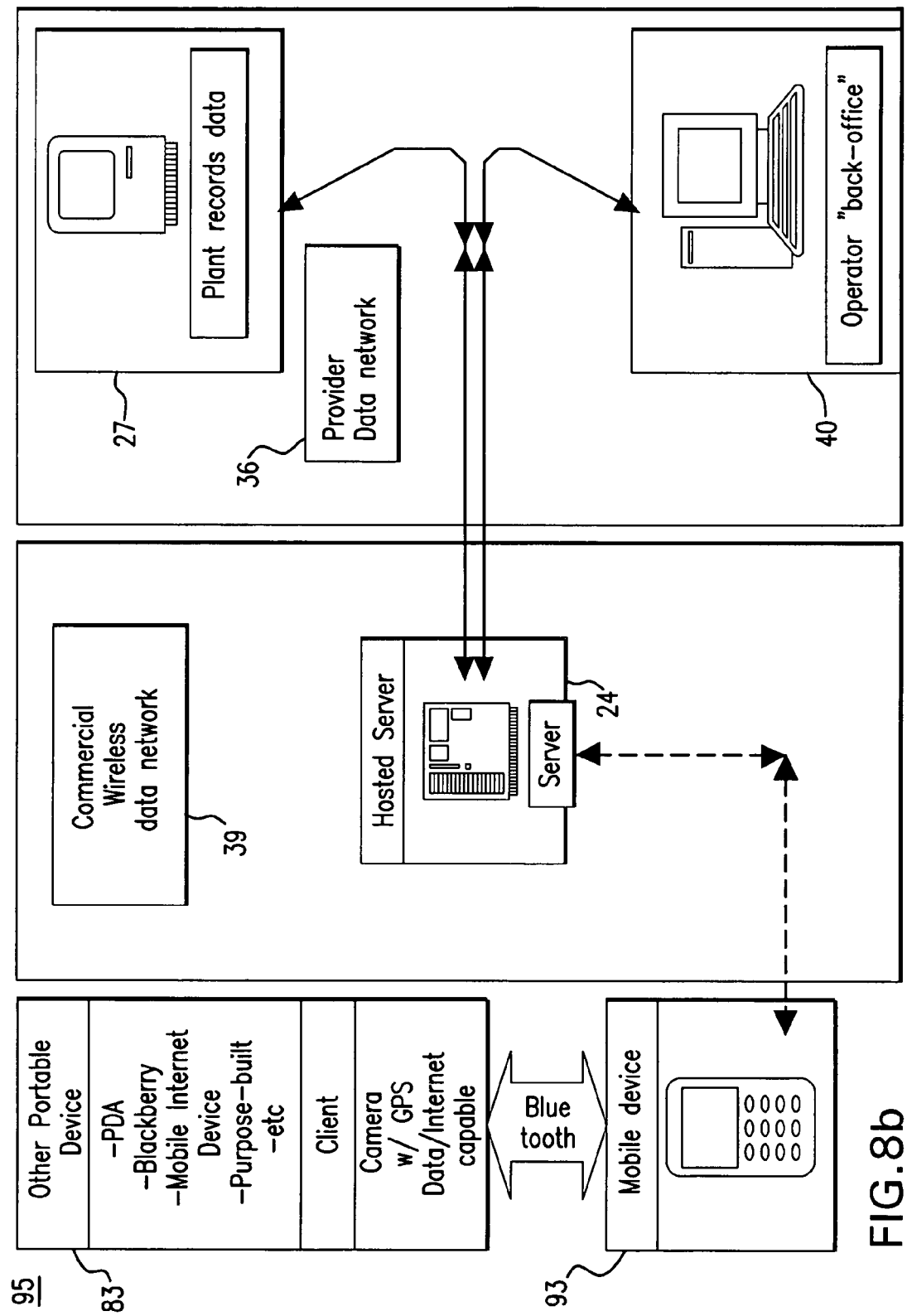

Referring now to FIGS. 8a and 8b, in embodiments where the client resides in an "other portable device 83" (like the PDA, Blackberry, micro-PC, PMP, wireless Internet device, iPhone, or other similar portable computing device), a mobile device 93, e.g., cell phone, can additionally be employed as an intermediate device to wirelessly connect the portable data collection device 83 to the server 24.

Figure 9A:
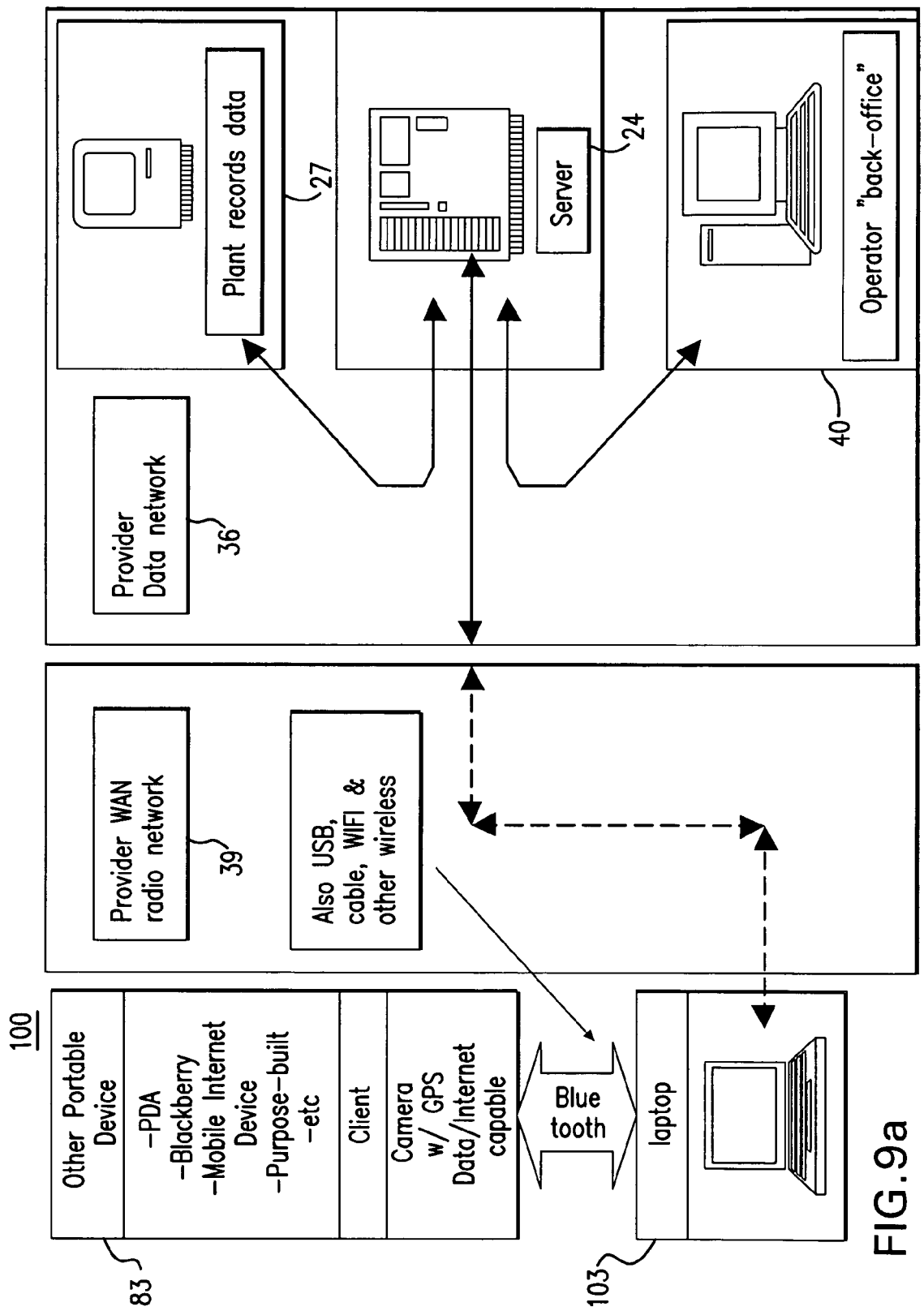
FIGS. 9A and 9B illustrate embodiments of a system of implementing and/or updating changes to infrastructure information utilizing a laptop/PC connected to other types of portable devices to provide an alternative wireless link.
Figure 9B:
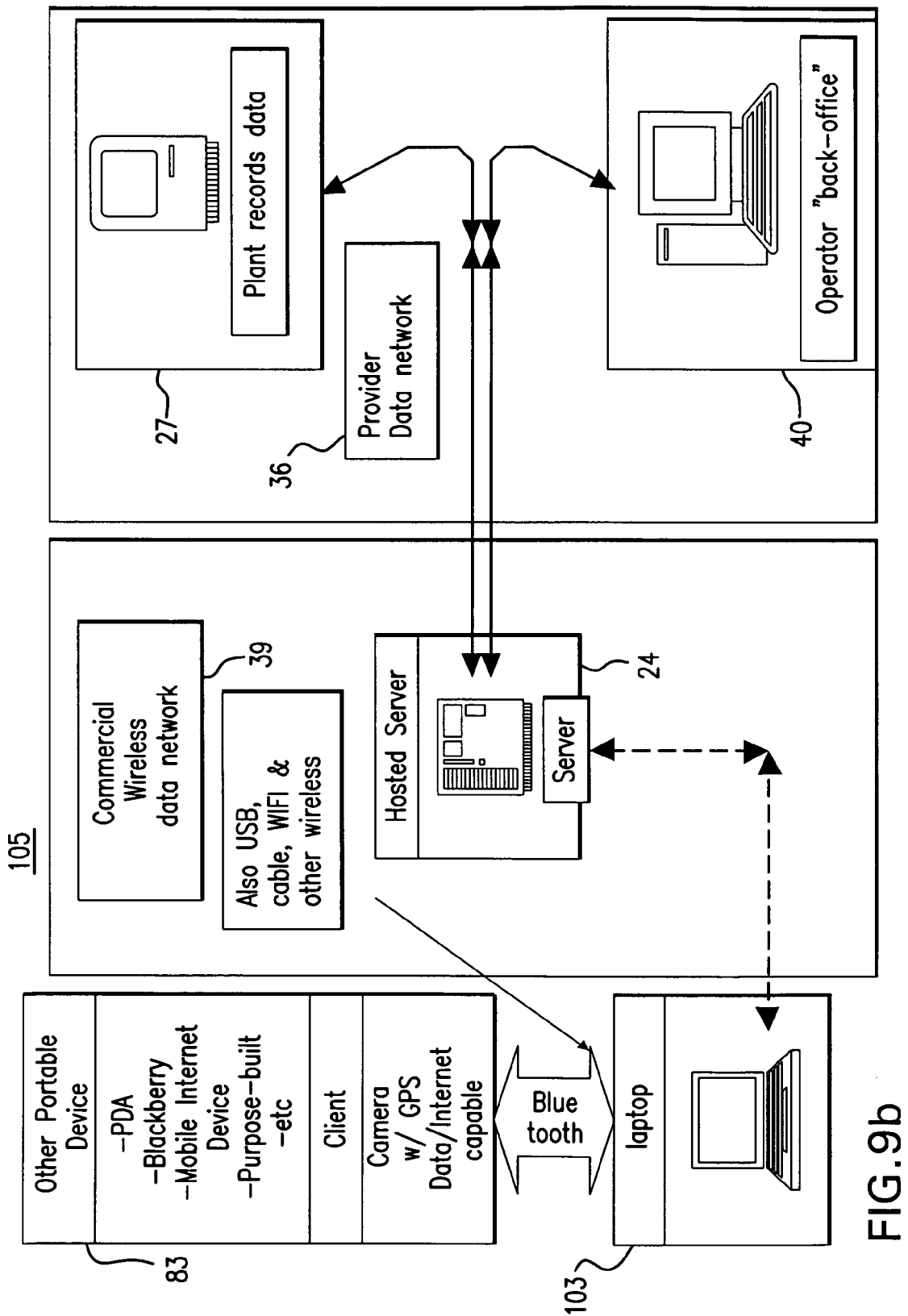

Similarly, as shown in FIGS. 9a and 9b, where the client resides in an "other portable device 83" (like a PDA, Blackberry, micro-, PMP, wireless Internet device, iPhone, or other similar portable computing device), a laptop computer 103 could be employed, instead of the cell phone 93, as an intermediate device to wirelessly connect the portable data collection device 83 to the server 24. Additionally, the portable data collection device 83 could connect to the cell phone, or laptop computer, via a wireless connection, e.g., "Bluetooth," or could alternatively use a serial cable connection.

FIGS. 6a through 9a differ from respective FIGS. 6b through 9b generally only in that in the "a" embodiment the server 24 is hosted by the operator, whereas in the "b" embodiment the server is commercially hosted. One of ordinary skill in the art will understand that various different devices and combinations thereof, can be used as the portable data collection device (33 for example), and that different manners of hosting the server 24 and using different wireless connection means can also be employed.

In further embodiments of the system, the server 24 can convert the image to text and extract the identifying information, then the server 24 can initiate the real time interactive session with the portable data collection device (33 for example) by automatically polling the infrastructure database 27 to obtain the previously existing infrastructure data corresponding to the identifying information thus extracted.

Alternatively, the portable data collection device (33 for example) can communicate the GPS data to the server 24, and the server 24 can initiate the real time interactive session by automatically polling the infrastructure database 27 to obtain the previously existing infrastructure data corresponding to the GPS data for the access interface 21.

In still further embodiments or the system, the server 24 can control the real time interactive session to request specific user input at the portable data collection device (33 for example) and limits options for the new changes to only such options as are authorized for the specific access interface 21, so as to minimize user input, communications bandwidth and time requirements. Additionally, the server 24 can analyze the preexisting and updated infrastructure data from the infrastructure database 27 in relation to the specific user input at the portable data collection device and can communicate to the portable data collection device the limited options available for effecting the new changes at the access interface 21. Moreover, the server 24 can analyze the previously recorded and the current infrastructure information in relation to the specific user input to determine the limited options for making the new changes. The server 24 can validate changes to the infrastructure information and can also prohibit improper changes to the infrastructure information.

In a particularly suitable application, the infrastructure information comprises telecommunications industry infrastructure, and the infrastructure information can more particularly comprise cable pairs and/or wire pairs.

A real time interactive method for updating infrastructure information and using updated infrastructure information to implement new changes to the infrastructure can generally comprise:
capturing infrastructure information in the field at an access interface 21, by a portable data collection device 18, the infrastructure information comprising:
any current infrastructure information associated with the access interface,
identifying information corresponding to the access interface, and
new changes made to the infrastructure information;
wirelessly communicating at least one of the current infrastructure information, the identifying information to a remote server 24, and the new changes;
obtaining, by the remote server 24, previously recorded infrastructure information, if any, for the access interface 21 from an infrastructure database 27 using the identifying information; and controlling, by the remote server 24, a real-time interactive session with the portable data collection device 18 to at least one of:
verify the previously recorded infrastructure information is consistent with the current infrastructure information at the access interface,
update the infrastructure information database 27 with the current infrastructure information if needed,
facilitate making the new changes using such updated infrastructure information, and
further update the infrastructure information database 27 with the new changes.

The method can further comprise capturing an image of the current infrastructure information and/or the identification information at the access interface 21, and wirelessly communicating the image to the server 24.

In further embodiments, the method can comprise converting the image to text; extracting the identifying information from the text; and initiating the real time interactive session by automatically requesting the previously existing infrastructure data corresponding to the identifying information. The method can also comprise obtaining GPS data associated with the access interface 21 and using the GPS data to verify the identifying information associated with the access interface 21.

Alternatively, the method can comprise using the GPS data as the identifying information, or at least a portion thereof, and initiating the real time interactive session by automatically requesting the previously existing infrastructure data corresponding to the GPS data for the access interface 21.

Further embodiments of the method can comprise requesting specific user input from the portable data collection device 18 and limiting options for making the new changes to only such options as are authorized for the specific access interface 21, such that user input, communications bandwidth and time requirements are minimized.

In additional embodiments, the method can comprise analyzing, by the server 24, the previously recorded and the current infrastructure information in relation to the specific user input to determine the limited options for making the new changes. Additional steps, by the server 24, can comprise validating changes to the infrastructure information and prohibiting improper changes to the infrastructure information.

As mentioned previously, a particularly suitable application for the method can be for the infrastructure information in the telecommunications industry, and the infrastructure data can more particularly comprise cable pairs and/or wire pairs.

Further to the description of the system and method provided above in connection with FIGS. 1 through 9b, the method and system can comprise a client and server software application in addition to the hardware components. More particularly, embodiments of the system and method for making and updating infrastructure changes can comprise custom client-server software applications for infrastructure/plant service & repair technicians to easily collect and share infrastructure/plant ID, location data, conditions, assignments, and faults as a matter of course during the performance of routine service and maintenance. The client-server software can comprises a unique, infrastructure and user focused client application and interface, residing on the portable data collection device 18, which can include the aforesaid GPS and/or camera/scanner. The wired and wireless links, client-server software, and infrastructure database can be used to input, share, recall, view, and poll unique infrastructure information. As mentioned previously, examples of information to be collected are mismatched telephone subscriber wire pair assignments, unreported & unusable wire pairs, moved pairs, and other plant conditions which have not been reported or captured in facilities records.

Some important benefits provided can include:

Collection of infrastructure information: facilitate the collection of the latest, minute-to-minute status of the infrastructure, such as telephone pair assignments and condition (not inclusive). This must add little burden to the job at hand; it must provide a fast and intuitive interface for any service technician, young or old, to input the data, but also to search and recall the most current data;

Sharing of infrastructure information: share the latest information in a wider and more reliable way, benefiting more technicians. Create a really easy and intuitive way for technicians to access and use the latest information; and Mining of infrastructure information: "data-mine" the information: provide a database and interfaces so plant owner/operators can access and leverage the latest data and plant status. For example use the data to update plant records in real-time and input into work orders saving time on service orders and repairs.

The client-user interface software, e.g., residing on the portable data collection device 18, can be designed to easily and quickly collect, share and data-mine infrastructure specific information, through a client and server application operating on custom or OTS (off the shelf) hardware (such as a typical PDA, laptops/PCs and servers). A rugged, small and mobile/portable outdoor device can combine one or more of image/OCR scanning, GPS location data, infrastructure data input, application and user interface software (very unique development), and wired and wireless links. The application and UI (User Interface) can be tailored to the service technicians with an understanding of their roles and responsibilities, minimizing the burden of the data collection. The interface can be designed to make it fast and easy for technicians to collect, recall, share, save, and upload information and data about the infrastructure.

The custom, portable client software, running on OTS (off-the-shelf) or custom portable devices, or laptops, can dynamically interact with the server function over wired, WLAN (wireless LAN), WWAN (Wireless Wide Area Network) and other access connections. The server application/function may run on laptops, PCs, and network servers. The portable data collection device application, or "client" (which may also be on a laptop), may also communicate with the server via cell phone using wireless modems and/or Bluetooth RF.

Embodiments also include development of a cell phone/mobile phone or smart phone client supporting the same functions.

As described above, the system/method can include a database function, to provide a central means to share the information among service technicians, check and search for the latest about a particular piece of infrastructure or customer, and also can provide a means by which operators may collect and update their plant records with the most current information. This can then be further leveraged to enhance infrastructure/plant records and other functions dependent on the records, such as fully automated dispatch.

As described previously in connection with FIGS. 1 through 9b, embodiments of the system can have multiple components:

portable collection device, which can include GPS, image scanner, wireless connections, and/or USB;

custom client application and interface software tailored to collect infrastructure/plant information such as access point and cable ID, and associated geo-location. Versions of the client can run on different portable and PC operating systems, such as Windows Mobile and Palm OS (not inclusive);

a server function to interact with the client software to manage and control the collection of infrastructure/plant data, and provide technician and operator access to the data. The infrastructure database can enable relational searches by infrastructure IDs, location and customer; and a server to run the server software and database, providing appropriate in and out-bound links, and appropriate data interfaces to operator systems.

Overall, the system and method of making and updating infrastructure changes can comprise an automated, dynamic and interactive client-server software system that enables field service personnel to easily update infrastructure/facility electronic information records in real-time using commercially available portable devices, such as cell phones and laptop computers, for example. The system and method can eliminate wasted time from inaccurate and out dated records, enabling operators to complete service and repairs faster and acquire new customers sooner; this is especially important in light of modern, automated, dynamic, work dispatch systems.

Figure 10A:
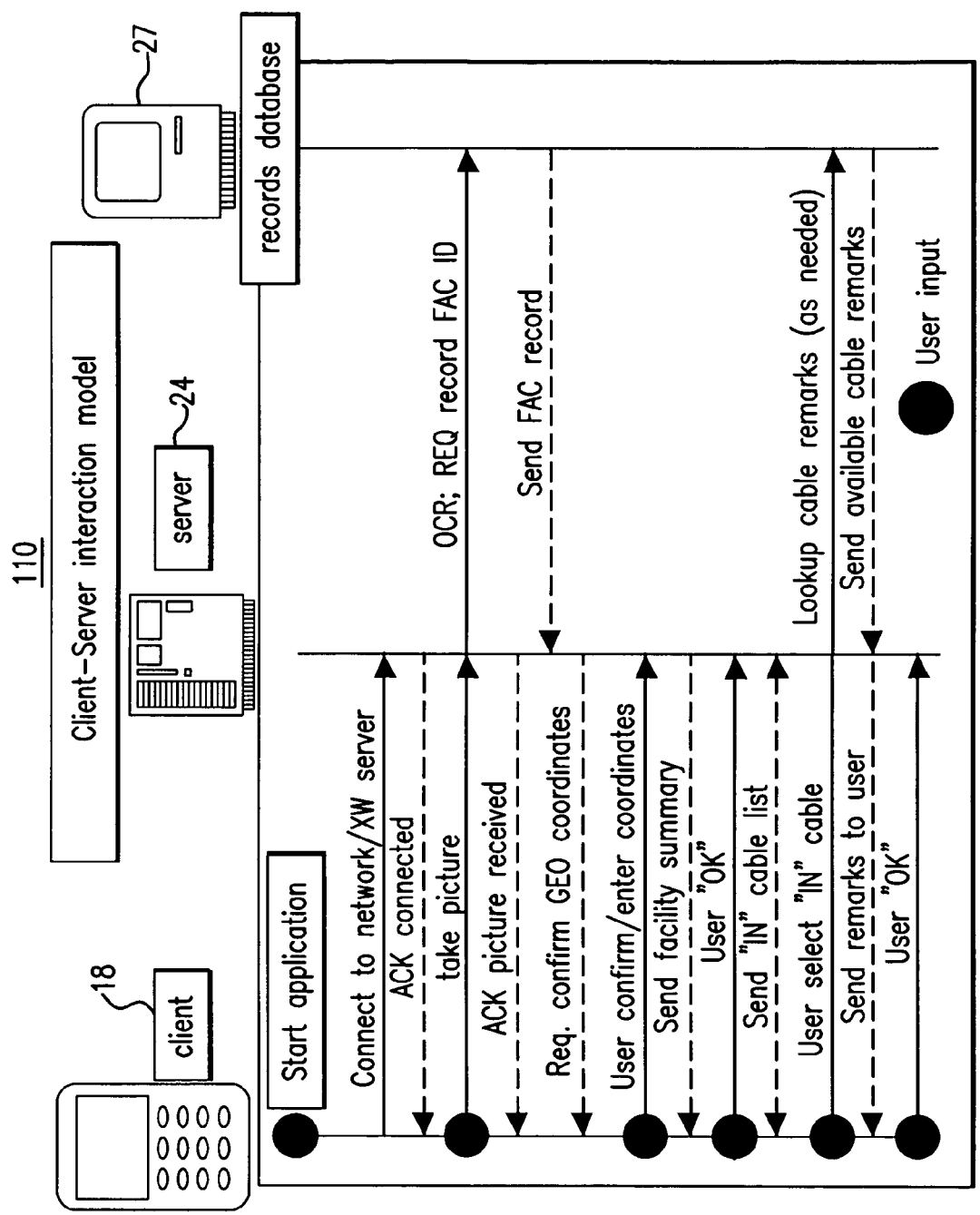
FIGS. 10A-10C illustrate an embodiment of a client-server interaction model for a system of implementing and/or updating changes to infrastructure information.
Figure 10B:
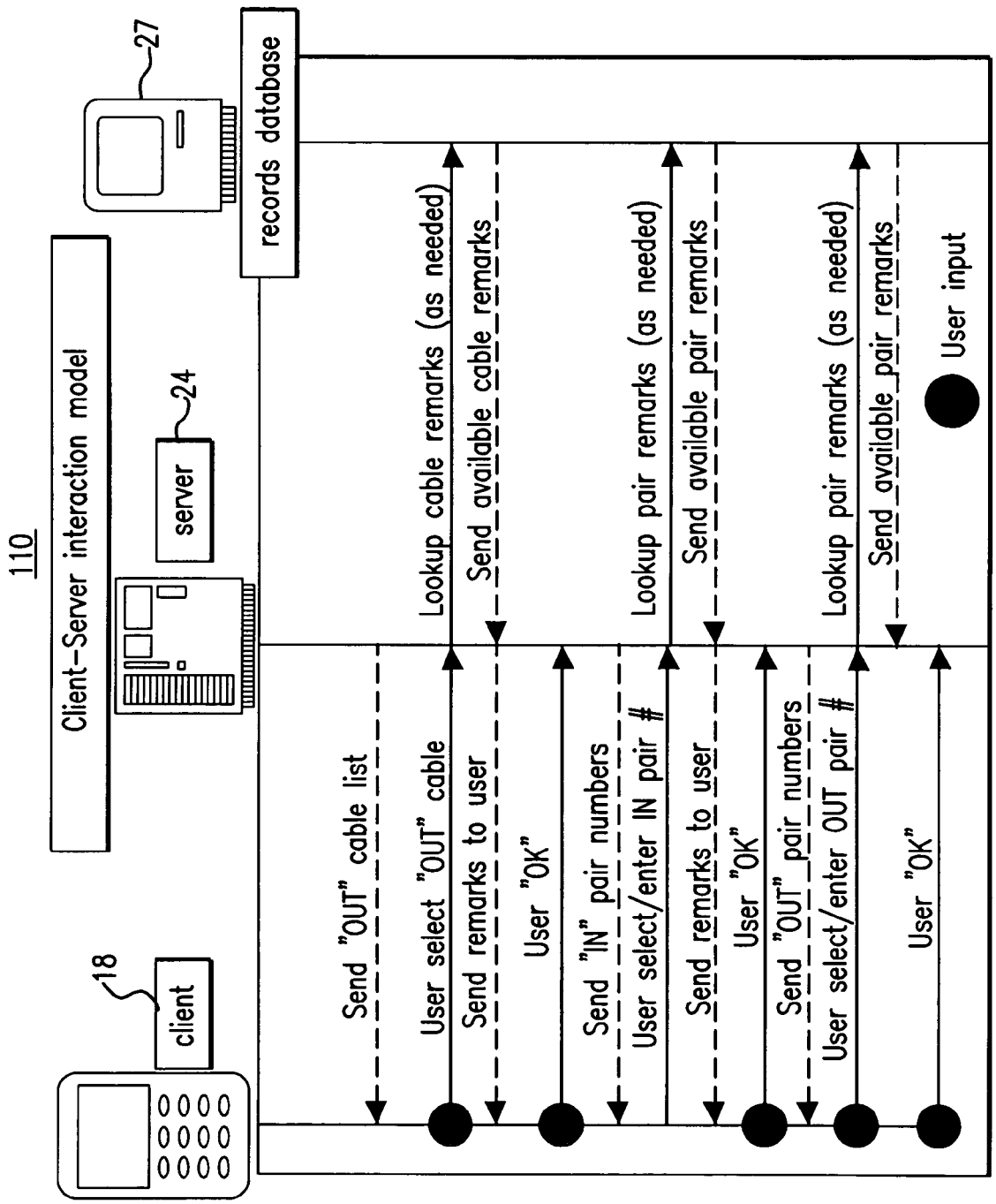
Figure 10C:
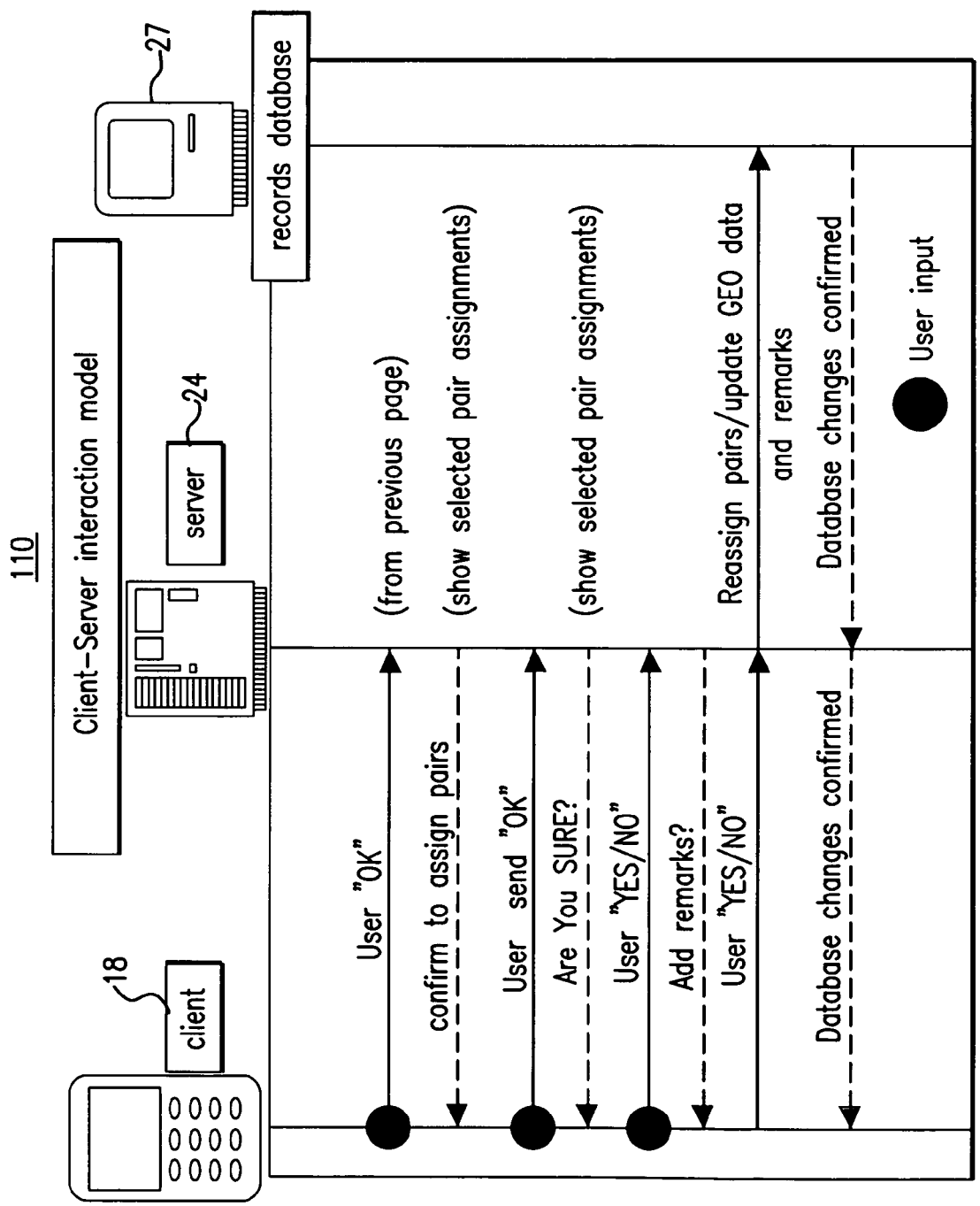

FIGS. 10A through 10C illustrate an exemplary client-server interaction software model residing on the client 18 (portable data collection device), whereas FIGS. 11a through 11j illustrate an exemplary software application model residing on the server 24.

Referring in particular to FIGS. 10A through 10C, the large black bullet indicates user input for the client/server interaction model shown, such input being performed in the field via the client 18 (i.e., a portable data collection device). As illustrated, the user can start the application, such as by typing a command or pushing a button on the keypad. Upon starting, the client 18 attempts to connect to the network server 24, and receives an acknowledgment (ACK) when connected. In certain embodiments as described previously, the client/portable data collection device 18 can be utilized to take a picture, such as of written information at the access interface, and the picture is transmitted to the server 24. The server 24 can convert the picture to text, extract the identifying information for the particular access interface, and request (REQ) a record from the records database 27, which can be the infrastructure information database 27 described previously which can contain previously recorded infrastructure information corresponding to the particular access interface. The server 24 can send an acknowledgment (ACK) that the picture was received, can send limited data from the facility (FAC) record, e.g., previously recorded infrastructure information for the particular access interface (it would not be normal to send the whole record, but instead only pertinent information from the record which the server has extracted, based on the server's program and purpose), and can also request confirmation information relating to the access interface, such as the GPS data associated with the access interface. This information can be used to verify that the access interface does in fact correspond to the access interface identified using other identifying information contained in the picture that was transmitted to the server 24. The next step can be user confirmation, i.e., entering of the GPS coordinates (GEO), and transmitting the same to the server 24. The server 24 can respond by sending a facility summary to the client 18, which can be a summary of infrastructure information for the particular access interface. The user can send an "OK" (confirmation) to the server 24 that the information was received. The server 24 can then send information to the client 18 regarding available "IN" cables and available "OUT" cables that can be selected by the user (possible inputs can be limited to those available at the particular access interface based on the facility ID and matching records). The user can select an "IN" cable, which is transmitted to the server 24, at which point the server 24 looks for any "cable remarks" in the records/infrastructure database 24 (as needed) and sends any such available cable remarks to the client 18. Similarly, the user then selects an "OUT" cable, the server 24 will look for cable remarks in the records database 27 (as needed) and send any available cable remarks to the client 18. The user can confirm (OK) in regard to receipt of any remarks for the "IN" or "OUT" cables. Next, the server 24 can send to the client 18 a list of available "IN" pair numbers from which the user selects/enters an "IN" pair number. The server 24 will then look up "pair remarks" (as needed) which may also be contained in the records database 27, and would send any such pair remarks to the client 18. The user can confirm (OK) receipt of any pair remarks, after which the server 24 will then send a list of available "OUT" pair numbers to the client 18. The user will then select/enter an "OUT" pair number and in response the server 24 will look for any pair remarks (as needed) and send any such pair remarks to the client 18. The user will confirm (OK) receipt of any pair remarks, and the server 24 will send the selected pair assignments to the client 18, and will query the user to confirm (OK) the selected pair assignments. The server will request that the user confirm (OK) the pair assignments before changes are made to the facility record, after which the server 24 can request an additional confirmation ("Are you sure?") if desired, to which the user can reply with a "YES" or "NO." The server 24 can also ask the user whether or not any remarks are to be added to the file, which the user can also respond to with a "YES" or "NO". The server 24 can then reassign the pairs, update the location (GEO) data and any remarks, and then confirm the database changes to the client 18.

As will be understood by one of ordinary skill in the art, the client 18—server 24 interaction model described above is merely an exemplarily embodiment of how the software could be designed to operate. It will also be understood by those of ordinary skill in the art that there are many different ways of designing the software to obtain the same results.

Turning now to FIGS. 11a through 11j, there is provided a flow chart of an exemplary software application model which can reside on the server, which interacts with and controls the real-time interactive session with the client/portable data collection device.

The flow chart is generally self-explanatory, and like the client/server interaction software model described previously, it is to be understood that one of ordinary skill in the art would understand, in view of this disclosure, that there are many different ways to implement such a software application model to obtain essentially the same functions, in that certain functions can be eliminated, and certain functions may be combined. Accordingly, the flow charts of FIGS. 11a through 11j are intended to be illustrative of a presently contemplated software application model according to the invention, and is not intended to illustrate every possible function or interaction for the server software application.

Overall features of the client-server system can generally comprise:
  simple and intuitive, purpose-built client running on GPS-camera phones, mobile devices and PCs;
  real-time, dynamic, & interactive server functions, managing the information, interaction, and access between users and electronic record databases;
  analysis of facility records offloading the processing load on the mobile device;
  an OCR function to automatically perform database search based on facility ID from camera phone picture and creating transactions; and
  Utilizing active wireless links, but also the ability to function "off-line" absent wireless signals and for delayed batch processing.

Features of the portable data collection device (mobile client) can generally comprise:
  menu-driven, optimized (for small mobile devices) user interface;
  controls user inputs;
  requests inputs from user;
  limits input choices to only those applicable to the facility;
  constantly indicates network, GPS and server connection status;
  constantly indicates status & progress of transactions;
  chat function;
  messaging/data exchange;
  double user validation of database changes; and
  confirmation of record changes.

Features of the server/software application functions can generally comprise:
  dynamic, live Interface to operator network, hosted or commercial;
  requests & analyzes operator facility records;
  controls user/database information exchange (interactive);
  OCR function to extract facility ID from picture;
  polls facilities database for designated data records based on identifying information;
  validates record changes;
  prohibited illegal changes and warns user;
  record change batch processing;
  transaction record backup;
  interactive Interface to mobile client; and
  message server (to registered phones/mobile devices).

The system/method can support different applications based on customer needs:
  customer may host, or may outsource, the server function;
  the client application may run on different devices,
    GPS camera phones, PDAs, mobile devices;
    PCs (with picture input from external device);
    other internet capable devices with GPS; and
  the system can use IP-based communications links, which can vary depending on operator network configurations.
  Additional/alternative functions can comprise:

GPS/geo mode in which the user can upload GPS data alone (i.e., picture not required);

off-line "batch" model in which the user can upload multiple pictures in one session;

message/bulletin broadcast from server;

chat/text messaging;

broadcast mode (like SMS/Text message notification) for urgent changes;

transaction history on mobile; and transaction record backup on server.

An automated, real-time, dynamic & interactive client-server software system as described herein can enable field service personnel to easily update facility electronic records in real-time using commercially available mobile phones and devices. The system and method can comprise dedicated server functions, including:

dynamic, live interface between electronic records systems & client (users);

controlling and managing interactive client user session;

providing network access control;

requesting pertinent facility records from electronic records system, processing file, and automatically generating transaction record;

automatically performing OCR function on camera picture to extract facility ID and request matching electronic record;

performing records analysis, offloading work from client/mobile device;

requesting user inputs of key data from client/mobile device (user);

limiting user requests to pertinent facility data (minimizing user input, communications bandwidth and time requirements);

automatically integrating GPS coordinates from client in facility record;

transmitting facilities messages and information to users;

sending facilities records updates in real-time or delayed;

providing chat server function;

providing message broadcast function (for urgent information); and transaction/change backup and log functions.

Customized client software can be designed which runs on:

commercial camera cell phones with GPS receiver;

commercial mobile devices such as PDAs; or commercial PCs; and is dynamic and interactive;

is optimized for facility information collection and update;

is controlled and managed by central server (to manage user session and inputs);

provides manual overrides and inputs;

limits user inputs to pertinent facility data;

captures and transmits camera phone picture to server;

captures and transmits GPS coordinates to server;

constantly indicates network, GPS and server connection status;

constantly indicates status and progress of transactions;

server driven, low bandwidth demand on communications links;

server driven, minimum resource burden on mobile devices;

holds transaction history (based on available memory);

historical transaction and record lookup; and/or chat/text messaging.

Real-time mobile wireless links between the server and the mobile client can comprise (not inclusive):

commercial cellular data networks;

operator cellular data network; and/or local wireless links when connecting via PCs or other intermediary devices.

The system can support off-line mode and batch processing, and can comprise picture/scanning and OCR text conversion function to automatically extract facility ID number. GPS coordinate inputs can also, or alternatively, be used, as described previously. As mentioned previously, exemplary devices for use as the mobile client/portable data collection device can comprise:

commercial GPS camera phone;

commercial PDAs with GPS & camera; and custom-built mobile devices with GPS & camera.

The devices can also accept user inputs absent GPS signals and perform a comparison between existing record coordinates of the access interface and current session GPS coordinates of mobile device.

Therefore, what has been described herein includes exemplary embodiments of a system and method of making and updating infrastructure information. It is, of course, not possible to describe every conceivable combination of components and/or methodologies for purposes of this description, but one of ordinary skill in the art may recognize that further combinations and permutations are possible in light of the overall teaching of this disclosure. Accordingly, the description provided herein is intended to be illustrative only, and should be considered to embrace any and all alterations, modifications, and/or variations that fall within the spirit and scope of the appended claims.

What is claimed is:

1. A real-time interactive system for updating infrastructure information and using updated infrastructure information to implement new changes to the infrastructure, said system comprising:

a. a wireless enabled portable data collection device for capturing infrastructure information in-field at an access interface, said infrastructure information comprising:
   i. any current infrastructure information associated with said access interface,
   ii. identification information corresponding to said access interface, and
   iii. new changes made to said infrastructure information;

b. an infrastructure information database, said infrastructure information database containing previously recorded infrastructure information, if any, corresponding to said access interface identification information;

c. a remote server communicating with said portable data collection device and said infrastructure information database via a suitable data network;

d. wherein at least one of said current infrastructure information, said identification information, and said new changes are wirelessly communicated to said remote server;

e. wherein said remote server controls a real-time interactive session with said portable data collection device to at least one of:
   i. verify said previously recorded infrastructure information is consistent with said current infrastructure information at said access interface,
   ii. update said infrastructure information database with said current infrastructure information if needed,
   iii. facilitate making said new changes using updated infrastructure information, and
   iv. further update said infrastructure information database with said new changes;

f. wherein said remote server controls said real time interactive session to request specific user input at said portable data collection device and limit options for said new changes to only such options as are authorized for said access interface, so as to minimize user input, communications bandwidth and time requirements;

g. wherein said remote server analyzes said previously recorded infrastructure information and said updated infrastructure information from said infrastructure information database in relation to said specific user input at said portable data collection device and communicates to said portable data collection device said limited options available for effecting said new changes at said access interface; and h. wherein said remote server analyzes said previously recorded infrastructure information and said current infrastructure information in relation to said specific user input to determine said limited options for making said new changes.

2. The system of claim 1 wherein said portable data collection device further comprises at least one of a digital camera and a scanning device to capture an image of at least one of said current infrastructure information and said identification information at said access interface, said digital camera or scanner being integral or connectable to said portable data collection device to transfer said images thereto.

3. The system of claim 1 wherein said portable data collection device further comprises a GPS receiver for obtaining GPS data associated with said access interface, and said GPS data comprising at least part of said identification information.

4. The system of claim 3 further comprising:
i. said portable data collection device communicating said GPS data to said remote server; and
ii. wherein said remote server initiates said real time interactive session by automatically requesting said previously recorded infrastructure information corresponding to said GPS data for said access interface.

5. The system of claim 2 wherein said portable data collection device comprises a cell phone with a camera for capturing said images and a GPS receiver for obtaining GPS data associated with said access interface.

6. The system of claim 2 wherein said portable data collection device comprises at least one of a laptop computer, PDA, Blackberry, micro-PC, PMP, portable internet device, and iPhone.

7. The system of claim 6 further comprising:
i. a cell phone;
ii. wherein said portable data collection device communicates with said remote server via said cell phone; and
iii. wherein said portable data collection device connects to said cell phone via one of a wireless connection and a serial cable connection.

8. The system of claim 2 further comprising:
i. said remote server converting said image to text and extracting said identification information; and
ii. wherein said remote server initiates said real time interactive session by automatically requesting said previously recorded infrastructure information corresponding to said identification information.

9. The system of claim 1 further comprising said remote server validating changes to said infrastructure information.

10. The system of claim 1 further comprising prohibiting improper changes to said infrastructure information, by said remote server.

11. The system of claim 1 wherein said infrastructure information comprises telecommunications industry infrastructure, and said previously recorded infrastructure information comprises at least one of cable pairs and wire pairs.

12. A real time interactive method for updating infrastructure information and using updated infrastructure information to implement new changes to the infrastructure, said method comprising:

a. capturing infrastructure information in-field at an access interface, by a portable data collection device, said infrastructure information comprising:
i. any current infrastructure information associated with said access interface,
ii. identifying information corresponding to said access interface, and
iii. new changes made to said infrastructure information;

b. wirelessly communicating at least one of said current infrastructure information, said identifying information to a remote server, and said new changes;

c. obtaining, by said remote server, previously recorded infrastructure information, if any, for said access interface from an infrastructure information database using said identifying information;

d. controlling, by said remote server, a real-time interactive session with said portable data collection device to at least one of:
i. verify said previously recorded infrastructure information is consistent with said current infrastructure information at said access interface,
ii. update said infrastructure information database with said current infrastructure information if needed,
iii. facilitate making said new changes using such updated infrastructure information, and
iv. further update said infrastructure information database with said new changes;

e. requesting, by said remote server, specific user input from said portable data collection device, and limiting options for making said new changes to only such options as are authorized for the specific access interface, such that user input, communications bandwidth and time requirements are minimized;

f. analyzing, by said remote server, said previously recorded infrastructure information and updated infrastructure information from said infrastructure information database in relation to said specific user input at said portable data collection device and communicating to said portable data collection device said limited options available for effecting said new changes at said access interface; and g. analyzing, by said remote server, said previously recorded infrastructure information and said current infrastructure information in relation to said specific user input to determine said limited options for making said new changes.

13. The method of claim 12 further comprising capturing an image of at least one of said current infrastructure information and said identifying information at said access interface, and wirelessly communicating said image to said remote server.

14. The method of claim 13 further comprising:
i. converting said image to text;
ii. extracting said identifying information from said text; and
ii. initiating said real time interactive session by automatically requesting said previously recorded infrastructure information corresponding to said identifying information.

15. The method of claim 14 further comprising;
i. obtaining GPS data associated with said access interface; and ii. using said GPS data to verify said identifying information associated with said access interface.

16. The method of claim 12 further comprising obtaining GPS data associated with said access interface.

17. The method of claim 16 further comprising:

i. using said GPS data as said identifying information; and ii. initiating said real time interactive session by automatically requesting said previously recorded infrastructure information corresponding to said identifying information.

18. The method of claim 12 further comprising validating changes to said infrastructure information, by said remote server.

19. The method of claim 12 further comprising prohibiting improper changes to said infrastructure information, by said remote server.

20. The method of claim 19 wherein said infrastructure information comprises telecommunications industry infrastructure, and said previously recorded infrastructure information comprises at least one of cable pairs and wire pairs.

* * * * *